United States Patent [19]

Nishimura et al.

[11] Patent Number: 5,696,611
[45] Date of Patent: Dec. 9, 1997

[54] COLOR PICTURE PROCESSING APPARATUS FOR REPRODUCING A COLOR PICTURE HAVING A SMOOTHLY CHANGED GRADATION

[75] Inventors: Kazuyuki Nishimura, Ichikawa; Shinichi Sato, Yokohama, both of Japan

[73] Assignee: Matsushita Graphic Communication Systems, Inc., Tokyo, Japan

[21] Appl. No.: 463,531

[22] Filed: Jun. 5, 1995

[30] Foreign Application Priority Data

Nov. 8, 1994 [JP] Japan .................................. 6-273577
Nov. 14, 1994 [JP] Japan .................................. 6-279118

[51] Int. Cl.$^6$ .......................... H04N 1/40; H04N 1/36; G03F 3/08
[52] U.S. Cl. .......................... 358/518; 358/465; 358/512; 358/515; 358/520
[58] Field of Search .......................... 358/518, 515, 358/520, 462, 465, 470, 529, 517, 530, 447, 456, 523; 382/162, 270

[56] References Cited

U.S. PATENT DOCUMENTS

| | | | |
|---|---|---|---|
| 4,887,150 | 12/1989 | Chiba et al. | 358/523 |
| 4,989,079 | 1/1991 | Ito | 358/520 |
| 5,214,517 | 5/1993 | Sullivan et al. | 358/456 |
| 5,315,382 | 5/1994 | Tanioka | 358/529 |
| 5,317,648 | 5/1994 | Sawada et al. | 382/162 |
| 5,392,139 | 2/1995 | Murata | 358/529 |
| 5,481,382 | 1/1996 | Takahashi et al. | 358/529 |
| 5,509,085 | 4/1996 | Kakutani | 358/518 |

*Primary Examiner*—Edward L. Coles, Sr.
*Assistant Examiner*—Mark Wallerson
*Attorney, Agent, or Firm*—Lowe, Price, LeBlanc & Becker

[57] ABSTRACT

An achromatic color judging region is determined in a red-green-blue (RGB) color system, and it is judged in an achromatic color judging unit whether or not a color picture at a remarked pixel designated by a R multi-valued digital input signal, a G multi-valued digital input signal and a B multi-valued digital input signal is placed within the achromatic color judging region. Also, the RGB multi-valued digital input signals are converted into pieces of RGB binary data in an error dispersion processing unit while dispersing errors occurring in the RGB binary data. In case where it is judged that the color picture is an achromatic color because the color picture is placed within the achromatic color judging region, a piece of achromatic color data is generated from the RGB binary data in an achromatic color reproducing and color transforming unit and is output to reproduce the color picture at the remarked pixel. In contrast, in case where it is judged that the color picture is a chromatic color because the color picture is not placed within the achromatic color judging region, the RGB binary data are output to reproduce the color picture at the remarked pixel. Therefore, the color picture can be reproduced in a smoothly changed gradation in a small sized color picture processing apparatus.

16 Claims, 16 Drawing Sheets

FIG. 7A

RGB→RGBK

| INPUT DATA | | | | OUTPUT DATA | | | |
|---|---|---|---|---|---|---|---|
| MO1A | RVSDA | GVSDA | BVSDA | RVSDB | GVSDB | BVSDB | KVSDB |
| 1 | 1 | 1 | 1 | 1 | 1 | 1 | 0 |
| 1 | 1 | 0 | 0 | 0 | 0 | 0 | 1 |
| 1 | 0 | 1 | 0 | 1 | 1 | 1 | 0 |
| 1 | 0 | 0 | 1 | 0 | 0 | 0 | 1 |
| 1 | 1 | 1 | 0 | 1 | 1 | 1 | 0 |
| 1 | 1 | 0 | 1 | 0 | 0 | 0 | 1 |
| 1 | 0 | 1 | 1 | 1 | 1 | 1 | 0 |
| 1 | 0 | 0 | 0 | 0 | 0 | 0 | 1 |

FIG. 7B

RGB→RGBK

| INPUT DATA | | | | OUTPUT DATA | | | |
|---|---|---|---|---|---|---|---|
| MO1A | RVSDA | GVSDA | BVSDA | RVSDB | GVSDB | BVSDB | KVSDB |
| 0 | 1 | 1 | 1 | 1 | 1 | 1 | 0 |
| 0 | 1 | 0 | 0 | 1 | 0 | 0 | 0 |
| 0 | 0 | 1 | 0 | 0 | 1 | 0 | 0 |
| 0 | 0 | 0 | 1 | 0 | 0 | 1 | 0 |
| 0 | 1 | 1 | 0 | 1 | 1 | 0 | 0 |
| 0 | 1 | 0 | 1 | 1 | 0 | 1 | 0 |
| 0 | 0 | 1 | 1 | 0 | 1 | 1 | 0 |
| 0 | 0 | 0 | 0 | 0 | 0 | 0 | 0 |

FIG. 12

| LUT ADDRESS | | SIX FACTOR REGION |
|---|---|---|
| UPPER PORTION | LOWER PORTION | |
| SELECTING SIGNAL 3 BITS | COLOR DIFFERENCE SIGNAL 9 BITS | VALUES OF EACH OF SIX MATRIX CORRECTING FACTORS |
| 000 ~ (M12) | 000000000 ~ 011111111 100000000 ~ 111111111 | M12× 0 ~ M12× 255 M12×-256 ~ M12× -1 |
| 001 ~ (M21) | 000000000 ~ 111111111 | M21× 0 ~ M21× -1 |
| 010 ~ (M31) | 000000000 ~ 111111111 | M31× 0 ~ M31× -1 |
| 011 ~ (M13) | 000000000 ~ 111111111 | M13× 0 ~ M13× -1 |
| 100 ~ (M23) | 000000000 ~ 111111111 | M23× 0 ~ M23× -1 |
| 101 ~ (M32) | 000000000 ~ 111111111 | M32× 0 ~ M32× -1 |

FIG. 17A

RGB→CMYK

| INPUT DATA | | | | OUTPUT DATA | | | |
|---|---|---|---|---|---|---|---|
| MO1A | RVSDA | GVSDA | BVSDA | CVSDB | MVSDB | YVSDB | KVSDB |
| 1 | 1 | 1 | 1 | 0 | 0 | 0 | 0 |
| 1 | 1 | 0 | 0 | 1 | 1 | 1 | 1 |
| 1 | 0 | 1 | 0 | 0 | 0 | 0 | 0 |
| 1 | 0 | 0 | 1 | 1 | 1 | 1 | 1 |
| 1 | 1 | 1 | 0 | 0 | 0 | 0 | 0 |
| 1 | 1 | 0 | 1 | 1 | 1 | 1 | 1 |
| 1 | 0 | 1 | 1 | 0 | 0 | 0 | 0 |
| 1 | 0 | 0 | 0 | 1 | 1 | 1 | 1 |

FIG. 17B

RGB→CMYK

| INPUT DATA | | | | OUTPUT DATA | | | |
|---|---|---|---|---|---|---|---|
| MO1A | RVSDA | GVSDA | BVSDA | CVSDB | MVSDB | YVSDB | KVSDB |
| 0 | 1 | 1 | 1 | 0 | 0 | 0 | 0 |
| 0 | 1 | 0 | 0 | 0 | 1 | 1 | 0 |
| 0 | 0 | 1 | 0 | 1 | 0 | 1 | 0 |
| 0 | 0 | 0 | 1 | 1 | 1 | 0 | 0 |
| 0 | 1 | 1 | 0 | 0 | 0 | 1 | 0 |
| 0 | 1 | 0 | 1 | 0 | 1 | 0 | 0 |
| 0 | 0 | 1 | 1 | 1 | 0 | 0 | 0 |
| 0 | 0 | 0 | 0 | 1 | 1 | 1 | 0 |

FIG. 18A

RGB→RGB

| INPUT DATA | | | | OUTPUT DATA | | |
|---|---|---|---|---|---|---|
| MO1A | RVSDA | GVSDA | BVSDA | RVSDB | GVSDB | BVSDB |
| 1 | 1 | 1 | 1 | 1 | 1 | 1 |
| 1 | 1 | 0 | 0 | 0 | 0 | 0 |
| 1 | 0 | 1 | 0 | 1 | 1 | 1 |
| 1 | 0 | 0 | 1 | 0 | 0 | 0 |
| 1 | 1 | 1 | 0 | 1 | 1 | 1 |
| 1 | 1 | 0 | 1 | 0 | 0 | 0 |
| 1 | 0 | 1 | 1 | 1 | 1 | 1 |
| 1 | 0 | 0 | 0 | 0 | 0 | 0 |

FIG. 18B

RGB→RGB

| INPUT DATA | | | | OUTPUT DATA | | |
|---|---|---|---|---|---|---|
| MO1A | RVSDA | GVSDA | BVSDA | RVSDB | GVSDB | BVSDB |
| 0 | 1 | 1 | 1 | 1 | 1 | 1 |
| 0 | 1 | 0 | 0 | 1 | 0 | 0 |
| 0 | 0 | 1 | 0 | 0 | 1 | 0 |
| 0 | 0 | 0 | 1 | 0 | 0 | 1 |
| 0 | 1 | 1 | 0 | 1 | 1 | 0 |
| 0 | 1 | 0 | 1 | 1 | 0 | 1 |
| 0 | 0 | 1 | 1 | 0 | 1 | 1 |
| 0 | 0 | 0 | 0 | 0 | 0 | 0 |

FIG. 19A

RGB→CMY

| INPUT DATA | | | | OUTPUT DATA | | |
|---|---|---|---|---|---|---|
| MOIA | RVSDA | GVSDA | BVSDA | CVSDB | MVSDB | YVSDB |
| 1 | 1 | 1 | 1 | 0 | 0 | 0 |
| 1 | 1 | 0 | 0 | 1 | 1 | 1 |
| 1 | 0 | 1 | 0 | 0 | 0 | 0 |
| 1 | 0 | 0 | 1 | 1 | 1 | 1 |
| 1 | 1 | 1 | 0 | 0 | 0 | 0 |
| 1 | 1 | 0 | 1 | 1 | 1 | 1 |
| 1 | 0 | 1 | 1 | 0 | 0 | 0 |
| 1 | 0 | 0 | 0 | 1 | 1 | 1 |

FIG. 19B

RGB→CMY

| INPUT DATA | | | | OUTPUT DATA | | |
|---|---|---|---|---|---|---|
| MOIA | RVSDA | GVSDA | BVSDA | CVSDB | MVSDB | YVSDB |
| 0 | 1 | 1 | 1 | 0 | 0 | 0 |
| 0 | 1 | 0 | 0 | 0 | 1 | 1 |
| 0 | 0 | 1 | 0 | 1 | 0 | 1 |
| 0 | 0 | 0 | 1 | 1 | 1 | 0 |
| 0 | 1 | 1 | 0 | 0 | 0 | 1 |
| 0 | 1 | 0 | 1 | 0 | 1 | 0 |
| 0 | 0 | 1 | 1 | 1 | 0 | 0 |
| 0 | 0 | 0 | 0 | 1 | 1 | 1 |

COLOR PICTURE PROCESSING APPARATUS FOR REPRODUCING A COLOR PICTURE HAVING A SMOOTHLY CHANGED GRADATION

BACKGROUND OF THE INVENTION

1. Field of the Invention

The present invention relates generally to a color picture processing apparatus, and more particularly to a color picture processing apparatus in which a color picture is reproduced in a smoothly changed gradation in a small sized circuit and a color correcting processing is performed in a small sized circuit.

2. Description of the Prior Art

Recently, the output of a color picture has been popularized in a printer field. Therefore, the processing of a color picture has been also popularized to receive or transmit the color picture with a facsimile apparatus. In a conventional color picture processing method, pieces of red-green-blue (RGB) multi-valued data of a color picture input with a picture input means are transformed into pieces of cyan-magenta-yellow (CMY) multi-valued data, a black (Bk) signal indicating a black component of the color picture is generated from the CMY multi-valued data to prepare pieces of cyan-magenta-yellow-black (CMYK) multi-valued data, and an error dispersion processing is performed to reduce errors included in the CMYK multi-valued data.

2.1. Previously Proposed Art

As an example, a conventional color picture processing method shown in FIGS. 1 to 3 is well-known. FIG. 1 is a block diagram showing an entire configuration of a conventional color picture processing apparatus.

As shown in FIG. 1, a conventional color picture processing apparatus 11 is composed of a color correcting unit 12 for receiving pieces of RGB multi-valued data representing a piece of multi-valued input data RCID indicating the red, a piece of multi-valued input data GCID indicating the green and a piece of multi-valued input data BCID indicating the blue of a color picture read with a color picture reading apparatus and correcting the RGB multi-valued data to correct the color of the color picture, a RGB/CMY color transforming unit 13 for transforming the RGB multi-valued data into pieces of CMY multi-valued data representing the cyan, the magenta and the yellow of the color picture, a Bk data generating unit 14 for generating a piece of Bk multi-valued data from the CMY multi-valued data, and an error dispersion unit 15 for dispersing errors included in the CMY multi-valued data and the Bk multi-valued data (called CMYK multi-valued data) and transforming the CMYK multi-valued data into pieces of CMYK binary data. The CMYK binary data are classified into a piece of MVSDA data, a piece of CVSDA data, a piece of YVSDA data and a piece of KVSDA data.

In the above configuration, the RGB multi-valued data read with the color picture reading apparatus are corrected in the color correcting unit 12 to correct the Color of the color picture, and the RGB multi-valued data are transformed into the CMY multi-valued data by the RGB/CMY color transforming unit 13. In detail, when values of a red component, a green component and a blue component in the RGB multi-valued data are indicated by R1,G1 and B1, values C1,M1,Y1 of a cyan component, a magenta component and a yellow component in the CMY multi-valued data are formulated according to equations (1) to (3).

$$C1 = 1 - R1 \tag{1}$$

$$M1 = 1 - G1 \tag{2}$$

$$Y1 = 1 - B1 \tag{3}$$

Thereafter, the CMY multi-valued data are input to the Bk data generating unit 14, and the Bk multi-valued data are generated. Thereafter, errors included in the C,M,Y and Bk components in the CMYK multi-valued data are respectively dispersed and transformed into the CMYK binary data in the error dispersion unit 15.

To generate the Bk multi-valued data in the Bk data generating unit 14, a ground color removing method or a skeleton black method is utilized. A generating method of the Bk multi-valued data according to the ground color removing method is initially described.

FIG. 2A shows a relationship among the values C1,M1, Y1 of the cyan (C) component, the magenta (M) component and the yellow (Y) component in the CMY multi-valued data.

In the ground color removing method, a minimum value among the values C1,M1,Y1 is defined as a ground value, a black (Bk) component having the ground value is generated by mixing the cyan component, the magenta component and the yellow component. In this case, the ground value is subtracted from each of the values of C, M and Y components. Therefore, values Bk1,C1', M1' and Y1' of the Bk, C, M and Y components obtained in the Bk data generating unit 14 are formulated according to equations (4) to (7).

$$Bk1 = Min\{C1,M1,Y1\} \times \beta \tag{4}$$

$$C1' = C1 - Bk1 \tag{5}$$

$$M1' = M1 - Bk1 \tag{6}$$

$$Y1' = Y1 - Bk1 \tag{7}$$

Here the symbol $\beta$ denotes a factor for the black component. A relationship among the values Bk1,C1', M1' and Y1' of the Bk, C, M and Y components obtained in the Bk data generating unit 14 according to the ground color removing method is shown in FIG. 2B.

Another generating method of the Bk multi-valued data according to the skeleton black method is described. The skeleton black method is determined by modifying the ground color removing method.

FIG. 3A shows a relationship among the values C1,M1, Y1 of the cyan (C) component, the magenta (M) component and the yellow (Y) component in the CMY multi-valued data.

In the skeleton black method, a threshold value $\alpha$ is predetermined to judge whether or not the Bk multi-valued data is to be generated. When a minimum value among the values C1,M1,Y1 of the C, M and Y components exceeds the threshold value $\alpha$, a black (Bk) component having an exceeding value defined as a difference between the minimum value and the threshold value $\alpha$ is generated by mixing the cyan component, the magenta component and the yellow component. In this case, the exceeding value is subtracted from each of the values of C, M and Y components. Therefore, values Bk2,C2', M2' and Y2' of the Bk, C, M and Y components obtained in the Bk data generating unit 14 are formulated according to equations (8) to (11).

$$\text{if } Min\{C1,M1,Y1\} > \alpha, \; Bk2 = Min\{C1,M1,Y1\} - \alpha \tag{8}$$

$$C2' = C1 - Bk2 \tag{9}$$

$$M2' = M1 - Bk2 \tag{10}$$

$$Y2' = Y1 - Bk2 \tag{11}$$

A relationship among the values Bk2,C2', M2' and Y2' of the Bk, C, M and Y components obtained in the Bk data generating unit 14 according to the skeleton black method is shown in FIG. 3B.

2.2. Problems to be Solved by the Invention

However, in the conventional color picture processing apparatus 11, because the RGB multi-valued data are transformed into the CMY multi-valued data, the Bk multi-valued data is generated according to the ground color removing method or the skeleton black method from the CMY multi-valued data, the errors included in the C,M,Y and Bk components are respectively dispersed, and the CMYK multi-valued data are transformed into the CMYK binary data, there is a drawback that a circuit configuration of the conventional color picture processing apparatus 11 is complicated. Also, there is another drawback that a circuit size of the conventional color picture processing apparatus 11 is enlarged.

Also, when a printer such as an ink jet printer applied for the binary data is utilized to print out the CMYK binary data, because the definition of the printer is not so high, there is another drawback that the color picture cannot be reproduced in a smoothly changed gradation. The reason is as follows.

When a piece of Bk binary data and a piece of CMY binary data of the CMYK binary data are respectively printed out after the error dispersion processing is respectively performed in the error dispersion unit 15 for the Bk multi-valued data generated according to the ground color removing method or the skeleton black method and the CMY multi-valued data, it is often required to print the Bk binary data and the CMY binary data to the same pixel in an overlap condition. However, because only one of the Bk binary data and the CMY binary data is allowed to be printed, a reflection factor corresponding to a data level expected before the error dispersion processing for the CMYK binary data cannot be obtained. Therefore, the combination of the ground color removing method or the skeleton black method and the error dispersion processing is a fatal drawback to a system in which it is required to make the definition of a reading unit agree with the resolution of a recording unit. For example, when the Bk binary data and the CMY binary data are respectively printed out with the ink jet printer to reproduce the color picture after the error dispersion processing is respectively performed for the Bk multi-valued data generated according to the ground color removing method and the CMY multi-valued data, the chromaticness of the color picture reproduced considerably deteriorates. In particular, a medium lightness portion in the color picture reproduced gets blurred in white. The reason is that the values of C, M and Y components printed out are totally reduced because the ground value is subtracted from each of the values of C, M and Y components in the ground color removing method. Also, in case of the skeleton black method, portions of the color picture cannot be reproduced in smooth changed gradation. The reason is that the chromaticness of the color picture suddenly varies when the minimum value of a component selected from among the C,M and Y components approaches the threshold value α.

Also, a correcting processing for the RGB multi-valued data performed in the color correcting unit 12 is formulated according to an equation (12).

$$\begin{bmatrix} R1 \\ G1 \\ B1 \end{bmatrix} = \begin{bmatrix} 1-M_{12}-M_{13} & M_{12} & M_{13} \\ M_{21} & 1-M_{21}-M_{31} & M_{23} \\ M_{31} & M_{32} & 1-M_{31}-M_{32} \end{bmatrix} \times \begin{bmatrix} R0 \\ G0 \\ B0 \end{bmatrix} \quad (12)$$

Here the symbols R0,G0 and B0 denote values of the multi-valued input data GCID,RCID and BCID. In this case, when the correcting processing is performed, it is required that a multiplying calculation is repeated three times for each of the multi-valued input data. Therefore, nine multipliers and an adder are required in the color correcting unit 12 to perform the correcting processing, and there is another drawback that the size of the conventional color picture processing apparatus 11 is inevitably enlarged.

SUMMARY OF THE INVENTION

A first object of the present invention is to provide, with due consideration to the drawbacks of such a conventional color picture processing apparatus, a color picture processing apparatus in which a color picture is reproduced in a smoothly changed gradation even though the color picture processing apparatus is manufactured in a small size.

Also, a second object of the present invention is to provide a color picture processing apparatus in which a color correcting processing is performed even though the color picture processing apparatus is manufactured in a small size.

The first object is achieved by the provision of a color picture processing apparatus, comprising:

achromatic color judging means for judging whether a color picture at a remarked pixel has an achromatic color or a chromatic color according to three pieces of multi-valued primary color data indicating three primary color components of the color picture;

binary data converting means for converting the multi-valued primary color data into three pieces of binary primary color data indicating the three primary color components of the color picture; and achromatic color reproducing means for generating and outputting a piece of achromatic color data indicating an achromatic color component of the color picture to reproduce the color picture of the remarked pixel according to the binary primary color data converted in the binary data converting means in case where it is judged by the achromatic color judging means that the color picture at the remarked pixel has the achromatic color and outputting the binary primary color data to reproduce the color picture of the remarked pixel in case where it is judged by the achromatic color judging means that the color picture at the remarked pixel has the chromatic color.

In the above configuration, three pieces of multi-valued primary color data produced by reading a color picture at a remarked pixel with a color picture reading means are transferred to the achromatic color judging means and the binary data converting means. In the achromatic color judging means, it is judged whether the color picture at the remarked pixel has an achromatic color or a chromatic color according to the multi-valued primary color data. In the binary data converting means, the multi-valued primary color data are converted into three pieces of binary primary color data.

Thereafter, in case where it is judged by the achromatic color judging means that the color picture at the remarked pixel has the achromatic color, a piece of achromatic color data indicating an achromatic color component of the color picture is generated in the achromatic color reproducing means according to the binary primary color data and are output to reproduce the color picture of the remarked pixel. In contrast, in case where it is judged by the achromatic color judging means that the color picture at the remarked pixel has the chromatic color, the binary primary color data are output from the achromatic color reproducing means without any color transformation to reproduce the color picture of the remarked pixel.

Accordingly, because the achromatic color data is generated and output in case where it is judged that the color picture at the remarked pixel has the achromatic color, the achromatic color of the remarked pixel can be easily reproduced even though the color picture processing apparatus is manufactured in a small size. Also, because the binary primary color data are output without changing the relationship among the three primary color components of the color picture at the remarked pixel in case where it is judged that the color picture at the remarked pixel has the chromatic color, the color picture can be reproduced in a smoothly changed gradation.

It is preferred that the achromatic color judging means comprise:

a maximum value detecting circuit for detecting a maximum value A from among three digital values of the multi-valued primary color data;

a minimum value detecting circuit for detecting a minimum value B from among three digital values of the multi-valued primary color data;

a difference calculating circuit for calculating a differential value A-B between the maximum value A detected by the maximum value detecting circuit and the minimum value B detected by the minimum value detecting circuit;

a dividing circuit for dividing the differential value A-B by the maximum value A detected by the maximum value detecting circuit to obtain a divided value (A-B)/A;

a selector for selecting an achromatic judging threshold value from a plurality of threshold values;

a comparator for comparing the divided value (A-B)/A obtained in the dividing circuit with the achromatic judging threshold value; and a judging signal producing circuit for producing an achromatic color judging signal indicating that the color picture at the remarked pixel has the achromatic color in case where the divided value (A-B)/A compared with the achromatic judging threshold value in the comparator is equal to or lower than the achromatic judging threshold value and producing an achromatic color judging signal indicating that the color picture at the remarked pixel has the chromatic color in case where the divided value (A-B)/A compared with the achromatic judging threshold value in the comparator is higher than the achromatic judging threshold value.

In the above configuration, in case where the divided value (A-B)/A is equal to or lower than the achromatic judging threshold value, an achromatic color judging signal indicating that the color picture at the remarked pixel has the achromatic color is produced in the judging signal producing circuit. In other words, an achromatic color region in RGB cubic coordinates of a RGB color space is defined within a hexagonal pyramid in which a central line connects a black color point (R=G=B=0) and a white color point (R=G=B= $2^N-1$ in 8-bit length data), a vertex is placed at the black color point and a hexagonal bottom plane is placed near to the white color point. Therefore, the achromatic color region is widened on a higher lightness side.

Accordingly, the color picture processing apparatus is useful for a printer used for reproducing colors defined in a CMY system. That is, because little attention is given to the reproduction of colors placed near to the black in the printer, the printer operated with the color picture processing apparatus can be useful.

The first object is also achieved by the provision of a color picture processing apparatus, comprising:

color difference calculating means for receiving a piece of first multi-valued primary color data, a piece of second multi-valued primary color data, a piece of third multi-valued primary color data indicating three primary color components of a color picture at a remarked pixel and calculating a piece of first multi-valued color difference data defined as a first difference between the first and second multi-valued primary color data, a piece of second multi-valued color difference data defined as a second difference between the first and third multi-valued primary color data and a piece of third multi-valued color difference data defined as a third difference between the second and third multi-valued primary color data;

matrix color correcting means for correcting the first, second and third multi-valued primary color data to a piece of first multi-valued corrected color data, a piece of second multi-valued corrected color data and a piece of third multi-valued corrected color data;

achromatic color judging means for judging whether the color picture at the remarked pixel has an achromatic color or a chromatic color according to the first, second and third multi-valued color difference data calculated by the color difference calculating means;

binary data converting means for converting the first, second and third multi-valued corrected color data obtained in the matrix color correcting means into three pieces of binary corrected color data; and achromatic color reproducing means for generating and outputting a piece of achromatic color data indicating an achromatic color component of the color picture to reproduce the color picture of the remarked pixel according to the binary primary color data converted in the binary data converting means in case where it is judged by the achromatic color judging means that the color picture at the remarked pixel has the achromatic color and outputting the binary primary color data to reproduce the color picture of the remarked pixel in case where it is judged by the achromatic color judging means that the color picture at the remarked pixel has the chromatic color.

In the above configuration, the first, second and third multi-valued color difference data are calculated from the first, second and third multi-valued primary color data in the color difference calculating means. Thereafter, the first, second and third multi-valued primary color data are corrected to the first, second and third multi-valued corrected color data in the matrix color correcting means, and the first, second and third multi-valued corrected color data are converted into the binary corrected color data in the matrix color correcting means. Also, in the achromatic color judging means, it is judged whether the color picture at the remarked pixel has an achromatic color or a chromatic color according the first, second and third multi-valued primary color data.

Thereafter, in case where it is judged by the achromatic color judging means that the color picture at the remarked pixel has the achromatic color, a piece of achromatic color data indicating an achromatic color component of the color picture is generated in the achromatic color reproducing means according to the binary corrected color data and are output to reproduce the color picture of the remarked pixel.

In contrast, in case where it is judged by the achromatic color judging means that the color picture at the remarked pixel has the chromatic color, the binary corrected color data are output from the achromatic color reproducing means without any color transformation to reproduce the color picture of the remarked pixel.

The second object is achieved by the provision of a color picture processing apparatus, comprising:

matrix correcting factor storing means for storing a plurality of first values of a first matrix correcting factor varying with a piece of first multi-valued color difference data defined as a first difference between pieces of first and second multi-valued primary color data, a plurality of second values of a second matrix correcting factor varying with a piece of second multi-valued color difference data defined as a second difference between pieces of first and third multi-valued primary color data and a plurality of third values of a third matrix correcting factor varying with a piece of third multi-valued color difference data defined as a third difference between pieces of second and third multi-valued primary color data;

color difference calculating means for receiving a piece of particular first multi-valued primary color data, a piece of particular second multi-valued primary color data, a piece of particular third multi-valued primary color data indicating three primary color components of a color picture at a remarked pixel and calculating a particular first difference value of a piece of particular first multi-valued color difference data defined as a first difference between the particular first and second multi-valued primary color data, a particular second difference value of a piece of particular second multi-valued color difference data defined as a second difference between the particular first and third multi-valued primary color data and a particular third difference value of a piece of particular third multi-valued color difference data defined as a third difference between the particular second and third multi-valued primary color data;

control means for controlling the selection of a particular first value of the first matrix correcting factor corresponding to the particular first difference value of the particular first multi-valued color difference data calculated in the color difference calculating means from among the first values stored in the matrix correcting factor storing means, the selection of a particular second value of the second matrix correcting factor corresponding to the particular second difference value of the particular second multi-valued color difference data calculated in the color difference calculating means from among the second values stored in the matrix correcting factor storing means, and the selection of a particular third value of the third matrix correcting factor corresponding to the particular third difference value of the particular third multi-valued color difference data calculated in the color difference calculating means from among the third values stored in the matrix correcting factor storing means;

corrected color data producing means for producing a piece of first multi-valued corrected color data from the particular first value of the first matrix correcting factor selected under the control of the control means and the particular first difference value of the first multi-valued color difference data calculated in the color difference calculating means, a piece of second multi-valued corrected color data from the particular second value of the second matrix correcting factor selected under the control of the control means and the particular second difference value of the second multi-valued color difference data calculated in the color difference calculating means, and a piece of third multi-valued corrected color data from the particular third value of the third matrix correcting factor selected under the control of the control means and the particular third difference value of the third multi-valued color difference data calculated in the color difference calculating means binary data converting means for converting the first, second and third multi-valued corrected color data produced in the corrected color data producing means into three pieces of binary color data;

achromatic color judging means for judging whether the color picture at the remarked pixel has an achromatic color or a chromatic color according to the particular first, second and third multi-valued color difference data calculated by the color difference calculating means; and achromatic color reproducing means for outputting a piece of achromatic color data to reproduce an achromatic color of the color picture in case where it is judged by the achromatic color judging means that the color picture at the remarked pixel has the achromatic color and outputting the binary color data converted by the binary data converting means to reproduce a chromatic color of the color picture in case where it is judged by the achromatic color judging means that the color picture at the remarked pixel has the chromatic color.

In the above configuration, a piece of first multi-valued color difference data is defined as a first difference between the first and second multi-valued primary color data, a piece of second multi-valued color difference data is defined as a second difference between the first and third multi-valued primary color data, and a piece of third multi-valued color difference data is defined as a third difference between the second and third multi-valued primary color data. A plurality of first values of a first matrix correcting factor varying with the first multi-valued color difference data, a plurality of second values of a second matrix correcting factor varying with the second multi-valued color difference data and a plurality of third values of a third matrix correcting factor varying with the third multi-valued color difference data are stored in advance in the matrix correcting factor storing means.

When a piece of particular first multi-valued primary color data, a piece of particular second multi-valued primary color data, a piece of particular third multi-valued primary color data indicating three primary color components of a color picture at a remarked pixel are input to the color difference calculating means, a particular first difference value of a piece of particular first multi-valued color difference data defined as a first difference between the particular first and second multi-valued primary color data, a particular second difference value of a piece of particular second multi-valued color difference data defined as a second difference between the particular first and third multi-valued primary color data and a particular third difference value of a piece of particular third multi-valued color difference data defined as a third difference between the particular second and third multi-valued primary color data are calculated.

Thereafter, a particular first value of the first matrix correcting factor corresponding to the particular first difference value of the particular first multi-valued color difference data, a particular second value of the second matrix correcting factor corresponding to the particular second difference value of the particular second multi-valued color difference data and a particular third value of the third matrix correcting factor corresponding to the particular third difference value of the particular third multi-valued color difference data are selected from among the first values stored in the matrix correcting factor storing means under the control of the controlling means. Thereafter, a piece of first multi-valued corrected color data is produced in the corrected color data producing means, for example, by adding the particular first value of the first matrix correcting factor and the particular first difference value of the first multi-valued color difference data, a piece of second multi-valued corrected color data is produced in the corrected color data producing means, for example, by adding the particular second value of the second matrix correcting factor and the particular second difference value of the second multi-valued color difference data, and a piece of third multi-valued corrected color data is produced in the corrected color data producing means, for example, by adding the particular third value of the third matrix correcting factor and the particular third difference value of the third multi-valued color difference data. The first, second and third multi-valued corrected color data are converted into three pieces of binary color data in the binary data converting means.

Also, whether the color picture at the remarked pixel has an achromatic color or a chromatic color is judged by the achromatic color judging means according to the particular first, second and third multi-valued color difference data. In case where it is judged that the color picture has an achromatic color, a piece of achromatic color data is output from the achromatic color reproducing means to reproduce an achromatic color of the color picture. In contrast, in case where it is judged that the color picture has a chromatic color, the binary color data are output from the achromatic color reproducing means to reproduce a chromatic color of the color picture.

Accordingly, because the first values of the first matrix correcting factor, the second values of the second matrix correcting factor and the third values of the third matrix correcting factor are stored in advance in the matrix correcting factor storing means, it is not required to calculate the particular first, second and third values of the first, second and third matrix correcting factors when the particular first, second and third multi-valued primary color data are input to the color picture processing apparatus. Therefore, any multiplier for obtaining the particular first, second and third values of the first, second and third matrix correcting factors is not required, and the color picture processing apparatus can be down-sized.

The second object is also achieved by the provision of a color picture processing apparatus, comprising:

matrix element storing means for storing a first matrix element, a second matrix element and a third matrix element of a color transforming matrix;

color difference calculating means for receiving a piece of first multi-valued primary color data, a piece of second multi-valued primary color data and a piece of third multi-valued primary color data indicating three primary color components of a color picture at a remarked pixel and calculating a piece of first multi-valued color difference data defined as a first difference between the first and second multi-valued primary color data, a piece of second multi-valued color difference data defined as a second difference between the first and third multi-valued primary color data and a piece of third multi-valued color difference data defined as a third difference between the second and third multi-valued primary color data;

multiplying means for multiplying the first multi-valued color difference data calculated in the color difference cal-culating means by the first matrix element stored in the matrix element storing means to produce a first matrix correcting factor, multiplying the second multi-valued color difference data calculated in the color difference calculating means by the second matrix element stored in the matrix element storing means to produce a second matrix correcting factor, and multiplying the third multi-valued color difference data calculated in the color difference calculating means by the third matrix element stored in the matrix element storing means to produce a third matrix correcting factor;

corrected color data producing means for producing a piece of first multi-valued corrected color data from the first matrix correcting factor obtained in the multiplying means and the first multi-valued color difference data calculated in the color difference calculating means, a piece of second multi-valued corrected color data from the second matrix correcting factor obtained in the multiplying means and the second multi-valued color difference data calculated in the color difference calculating means and a piece of third multi-valued corrected color data from the third matrix correcting factor obtained in the multiplying means and the third multi-valued color difference data calculated in the color difference calculating means;

binary data converting means for converting the first, second and third multi-valued corrected color data produced in the corrected color data producing means into three pieces of binary color data;

achromatic color judging means for judging whether the color picture at the remarked pixel has an achromatic color or a chromatic color according to the first, second and third multi-valued color difference data calculated by the color difference calculating means; and achromatic color reproducing means for outputting a piece of achromatic color data to reproduce an achromatic color of the color picture in case where it is judged by the achromatic color judging means that the color picture at the remarked pixel has the achromatic color and outputting the binary color data converted by the binary data converting means to reproduce a chromatic color of the color picture in case where it is judged by the achromatic color judging means that the color picture at the remarked pixel has the chromatic color.

In the above configuration, a first matrix element, a second matrix element and a third matrix element of a color transforming matrix are stored in advance in the matrix element storing means. When a piece of first multi-valued primary color data, a piece of second multi-valued primary color data and a piece of third multi-valued primary color data indicating three primary color components of a color picture at a remarked pixel are input to the color difference calculating means, a piece of first multi-valued color difference data, a piece of second multi-valued color difference data and a piece of third multi-valued color difference data are calculated. Thereafter, in the multiplying means, the first multi-valued color difference data is multiplied by the first matrix element to produce a first matrix correcting factor, the second multi-valued color difference data is multiplied by the second matrix element to produce a second matrix correcting factor, and the third multi-valued color difference data is multiplied by the third matrix element to produce a third matrix correcting factor.

Thereafter, in the corrected color data producing means, a piece of first multi-valued corrected color data is produced from the first matrix correcting factor and the first multi-valued color difference data, a piece of second multi-valued corrected color data is produced from the second matrix correcting factor and the second multi-valued color difference data, and a piece of third multi-valued corrected color data is produced from the third matrix correcting factor and the third multi-valued color difference data. The first, second and third multi-valued corrected color data are converted into three pieces of binary color data in the binary data converting means.

Also, whether the color picture at the remarked pixel has an achromatic color or a chromatic color is judged by the achromatic color judging means according to the first, second and third multi-valued color difference data. In case where it is judged that the color picture has an achromatic color, a piece of achromatic color data is output from the achromatic color reproducing means to reproduce an achromatic color of the color picture. In contrast, in case where it is judged that the color picture has a chromatic color, the binary color data are output from the achromatic color reproducing means to reproduce a chromatic color of the color picture.

Accordingly, because only the first, second and third matrix elements are stored in advance in the matrix element storing means and the first, second and third matrix correcting factors are obtained in the multiplying means, even though a storage capacity of the matrix element storing means is small, the color picture of the remarked pixel can be reduced by only adding the multiplying means. Therefore, the color picture processing apparatus can be down-sized.

BRIEF DESCRIPTION OF THE DRAWINGS

The objects, features and advantages of the present invention will be apparent from the following description taken in conjunction with the accompanying drawings, in which:

FIG. 7A shows a table of transformation codes utilized to transform pieces of RGB binary data RVSDA, GVSDA, BVSDA to pieces of RGB output binary data RVSDB, GVSDB, BVSDB and KVSDB in case where it is judged in an achromatic color reproducing and color transforming unit that a remarked pixel has an achromatic color;

FIG. 7B shows a table of transformation codes utilized to transform the RGB binary data RVSDA, GVSDA, BVSDA to the RGB output binary data RVSDB, GVSDB, BVSDB and KVSDB in case where it is judged in the achromatic color reproducing and color transforming unit that the remarked pixel has a chromatic color;

FIG. 12 shows an LUT address map of matrix correcting factors $D_{12}$ to $D_{32}$ stored in a look up table shown in FIG. 9;

FIG. 17A shows a table of transformation codes utilized to transform the RGB binary data RVSDA, GVSDA, BVSDA to pieces of CMYK output binary data CVSDB, MVSDB, YVSDB and KVSDB in case where it is judged in the achromatic color reproducing and color transforming unit that the remarked pixel has an achromatic color;

FIG. 17B shows a table of transformation codes utilized to transform the RGB binary data RVSDA, GVSDA, BVSDA to the CMYK output binary data CVSDB, MVSDB, YVSDB and KVSDB in case where it is judged in the achromatic color reproducing and color transforming unit that the remarked pixel has a chromatic color;

FIG. 18A shows a table of transformation codes utilized to transform the RGB binary data RVSDA, GVSDA, BVSDA to pieces of RGB output binary data RVSDB, GVSDB and BVSDB in case where it is judged in the achromatic color reproducing and color transforming unit that the remarked pixel has an achromatic color;

FIG. 18B shows a table of transformation codes utilized to transform the RGB binary data RVSDA, GVSDA, BVSDA to the RGB output binary data RVSDB, GVSDB and BVSDB in case where it is judged in the achromatic color reproducing and color transforming unit that the remarked pixel has a chromatic color;

FIG. 19A shows a table of transformation codes utilized to transform the RGB binary data RVSDA, GVSDA, BVSDA to pieces of CMY output binary data CVSDB, MVSDB and YVSDB in case where it is judged in the achromatic color reproducing and color transforming unit that the remarked pixel has an achromatic color; and FIG. 19B shows a table of transformation codes utilized to transform the RGB binary data RVSDA, GVSDA, BVSDA to the CMY output binary data CVSDB, MVSDB and YVSDB in case where it is judged in the achromatic color reproducing and color transforming unit that the remarked pixel has a chromatic color.

DESCRIPTION OF THE PREFERRED EMBODIMENTS

Preferred embodiments of a color picture processing apparatus according to the present invention are described with reference to drawings.

Figure 1:
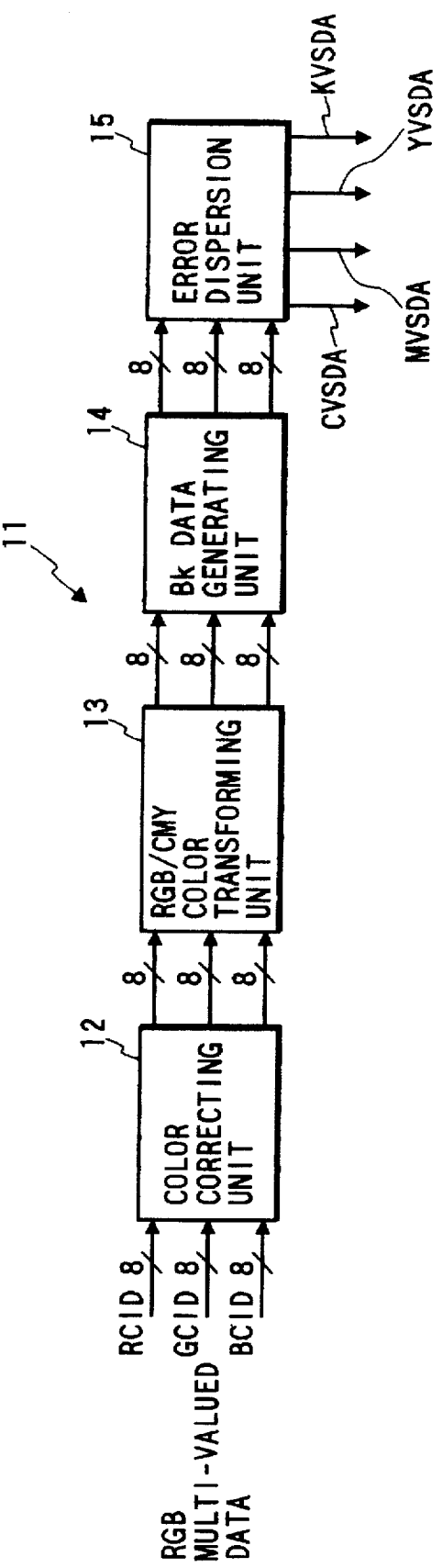
FIG. 1 is a block diagram showing an entire configuration of a conventional color picture processing apparatus.
Figure 2A:
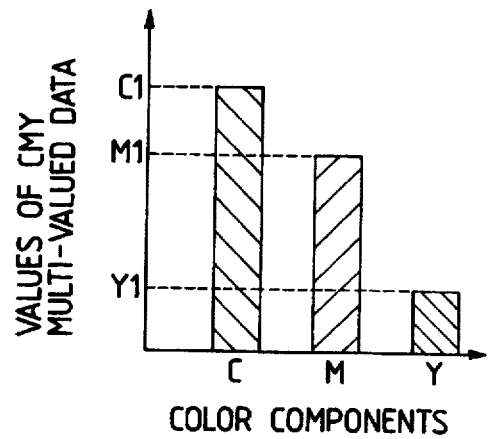
FIG. 2A shows a relationship among values C1,M1,Y1 of a cyan (C) component, a magenta (M) component and a yellow (Y) component in CMY multi-valued data.
Figure 2B:
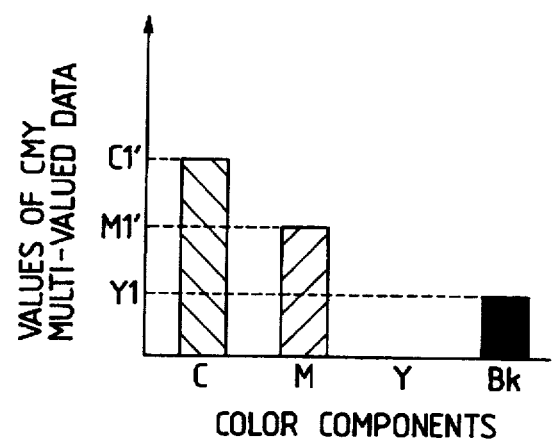
FIG. 2B shows a relationship among values Bk1,C1', M1' and Y1' of the Bk, C, M and Y components obtained in a Bk data generating unit shown in FIG. 1 according to a ground color removing method.
Figure 3A:
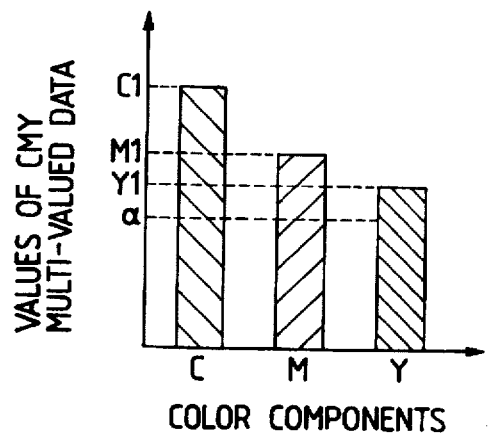
FIG. 3A shows a relationship among values C1,M1,Y1 of a cyan (C) component, a magenta (M) component and a yellow (Y) component in CMY multi-valued data.
Figure 3B:
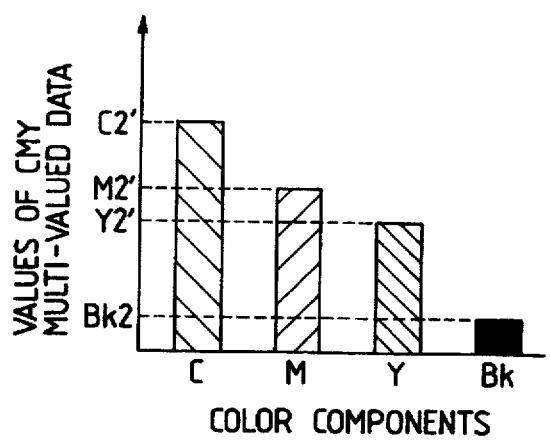
FIG. 3B shows a relationship among values Bk1,C1', M1' and Y1' of the Bk, C, M and Y components obtained in a Bk data generating unit shown in FIG. 1 according to a black skeleton method.
Figure 4:
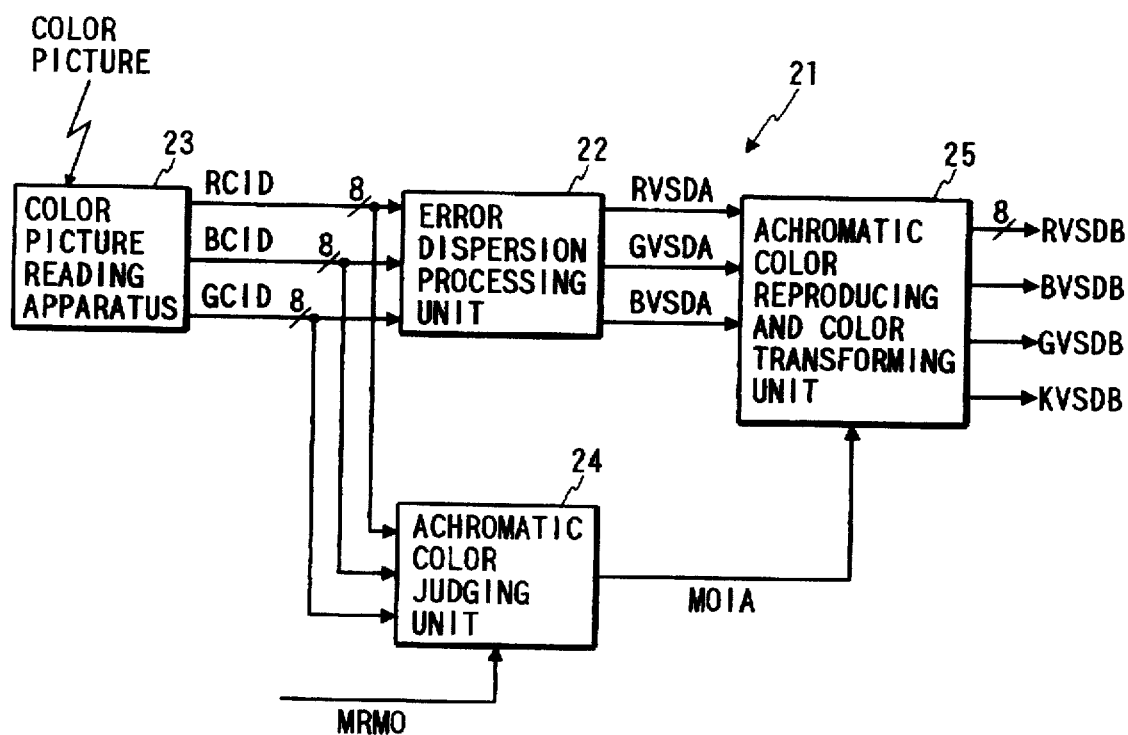
FIG. 4 is a block diagram of a color picture processing apparatus according to a first embodiment of the present invention.

FIG. 4 is a block diagram of a color picture processing apparatus according to a first embodiment of the present invention.

As shown in FIG. 4, a color picture processing apparatus 21 comprises an error dispersion processing unit 22 for receiving a group of three multi-valued digital input signals GCID, RCID and BCID which is obtained every operating time by reading a color picture of an remarked pixel with a color picture reading apparatus 23 and for transforming the multi-valued digital input signals GCID, RCID and BCID into pieces of RGB binary data classified into a piece of R binary data, a piece of G binary data and a piece of B binary data while dispersing errors occurring in the RGB binary data to peripheral pixels adjacent to the remarked pixel, an achromatic color judging unit 24 for receiving the multi-valued digital input signals GCID, RCID and BCID and for judging whether the remarked pixel has an achromatic color or a chromatic color according to the multi-valued digital input signals GCID, RCID and BCID, and an achromatic color reproducing and color transforming unit 25 for generating and outputting pieces of achromatic color data KVSDA according to the RGB binary data transformed in the error dispersion processing unit 22 in case where it is judged by the achromatic color judging unit 24 that the remarked pixel has an achromatic color and for outputting the RGB binary data GVSDA, RVSDA and BVSDA in case where it is judged by the achromatic color judging unit 24 that the remarked pixel has a chromatic color. The multi-valued digital input signals GCID, RCID and BCID respectively has an eight bit length, a multi-valued digital input signal GCID denotes a green component of the color picture in the remarked pixel, a multi-valued digital input signal RCID denotes a red component of the color picture, and a multi-valued digital input signal BCID denotes a blue component of the color picture. The R binary data relates to the red component of the color picture, the G binary data relates to the green component of the color picture, and the B binary data relates to the blue component of the color picture.

In the error dispersion processing unit 22, because errors occur in the RGB binary data corresponding to the remarked pixel when the multi-valued digital input signals are converted into the RGB binary data on the basis of a slice level, three types of binary processing for red, green and blue are respectively performed without any connection with each other while an error occurring in each of the RGB binary data is dispersed to the peripheral pixels according to an error dispersion processing. The RGB binary data classified into a piece of red binary data, a piece of green binary data and a piece of blue binary data are transferred to the achromatic color reproducing and color transforming unit 25.

An achromatic color judging method performed in the achromatic color judging unit 24 is described before the achromatic color judging unit 24 is described in detail.

Figure 5:
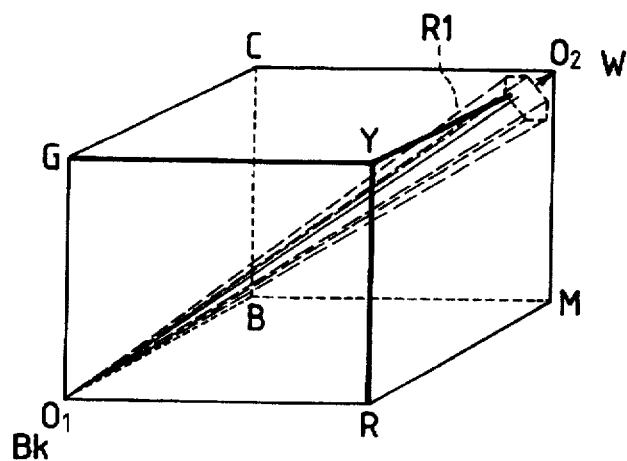
FIG. 5 is a model view explanatorily showing a principle of an achromatic color judging method performed in an achromatic color judging unit shown in FIG. 4.

FIG. 5 is a model view explanatorily showing a principle of an achromatic color judging method performed in the achromatic color judging unit 24.

As shown in FIG. 5, a color space in which all of colors defined in a RGB color system and a CMY color system are placed is expressed by cubic coordinates, and an achromatic color region in the color space is specified according to a high lightness considering method of the achromatic color judging method. In FIG. 5, a symbol $O_1$ denotes an original point of RGB color coordinates $O_1$-RGB in the RGB color system and corresponds to the black (Bk), and a symbol $O_2$ denotes an original point of CMY color coordinates $O_2$-CMY in the CMY color system and corresponds to the white (W). Also, the red in the RGB system and the cyan in the CMY system have a complementary color relationship, the blue in the RGB system and the yellow in the CMY system have a complementary color relationship, and the green in the RGB system and the magenta in the CMY system have a complementary color relationship. Therefore, an arrangement relationship between the red and cyan is set to be place the red and the cyan at both ends of a diagonal line of the cubic coordinates. Also, the blue and the yellow is placed at both ends of another diagonal line of the cubic coordinates, and the green and the magenta is placed at both ends of the other diagonal line of the cubic coordinates.

In the high lightness considering method, an achromatic color region R1 in which many colors (R,G,B) equivalent to the achromatic color are placed is defined on condition that an equation (13) is satisfied.

$$\{Max(R,G,B)-Min(R,G,B)\}/Max(R,G,B) \leq S1 \qquad (13)$$

Here the symbol S1 denotes a range of the achromatic color region R1.

The achromatic color region R1 defined according to the equation (13) corresponds to an internal region of a hexagonal pyramid R1 in which a central axis is equal to a diagonal line connecting the original point $O_1$ (red, green and blue components are respectively zero) and the original point $O_2$ (red, green and blue components are respectively maximized to a value 255 in an eight bit expression), a vertex is placed at the original point $O_1$ and a hexagonal bottom plane is placed close to the original point $O_2$.

Therefore, the achromatic color region S1 is not limited to the diagonal line connecting the original point $O_1$ and the original point $O_2$ but is widened on the side of a high lightness region near to the original point $O_2$ according to the high lightness considering method.

As for the achromatic color judging unit 24, an achromatic color judging unit formed in a maximum value and minimum value detecting type is, for example, utilized in this embodiment.

Figure 6:
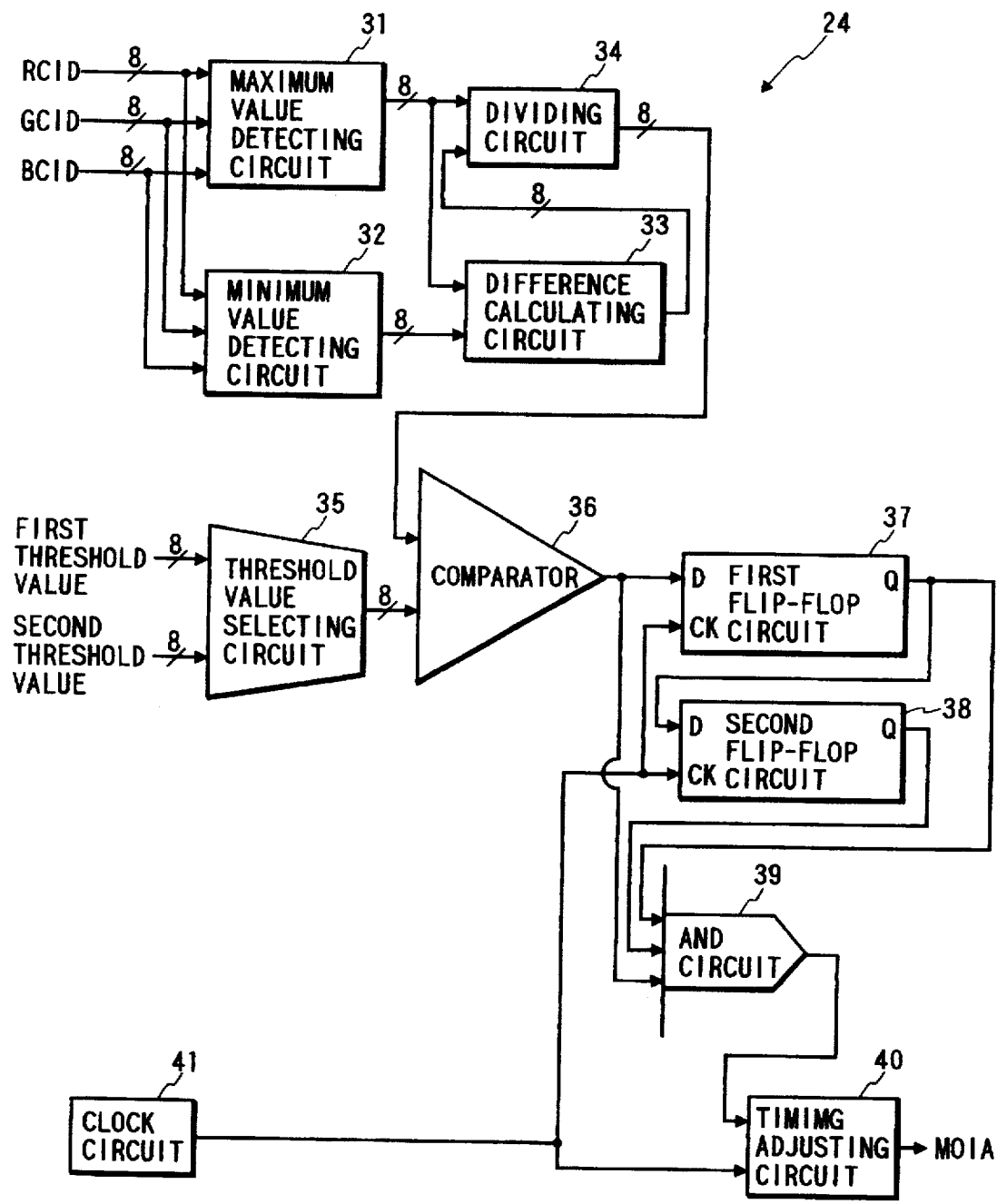
FIG. 6 is a block diagram of an achromatic color judging unit formed in a maximum value and minimum value detecting type.

As shown in FIG. 6, the achromatic color judging unit 24 comprises a maximum value detecting circuit 31 for receiving a group of the multi-valued digital input signals GCID, RCID and BCID transferred in time sequence every operating time and detecting a maximum value A from among digital values of the multi-valued digital input signals, a minimum value detecting circuit 32 for receiving the multi-valued digital input signals GCID, RCID and BCID every operating time and detecting a minimum value B from among the digital values of the multi-valued digital input signals, a difference calculating circuit 33 for calculating a difference value A-B between the maximum value A and the minimum value B, a dividing circuit 34 for dividing the difference value A-B by the maximum value A to obtain a calculated result (A-B)/A, a threshold value selecting circuit 35 for selecting an achromatic judgement threshold value from a first threshold value and a second threshold value according to a threshold selecting signal transferred from a control unit (not shown), a comparator 36 for comparing the calculated result (A-B)/A with the achromatic judgement threshold value to judge whether or not the remarked pixel has an achromatic color and outputting a compared result each time the input signals are input to the circuits 31, 32, a first flip-flop circuit 37 for holding the compared result every operating time, a second flip-flop circuit 38 for holding the compared result transferred from the first flip-flop circuit 37 every operating time, an AND circuit 39 for calculating a logical multiply of the compared result held in the first flip-flop circuit 37, the compared result held in the second flip-flop circuit 38 and the compared result currently output from the comparator 36, a timing adjusting circuit 40 for outputting the logical multiply as an achromatic color judging signal MOIA in synchronization with the RGB binary data output from the error dispersion processing unit 22 while adjusting the time delay resulting from an operating time required in the error dispersion processing unit 22, and a clock circuit 41 for controlling the operation timing of the flip-flop circuits 37, 38 and the timing adjusting circuit 40 for an achromatic color judging processing.

In the achromatic color reproducing and color transforming unit 25, pieces of achromatic color data or the RGB binary data are output according to the achromatic color judging signal MOIA output from the timing adjusting circuit 40. In this case, whether or not the achromatic color data KVSDA is generated is determined by substituting the G binary data to reproduce black or white.

In the above configuration, an operation performed in the color picture processing apparatus 21 is described.

The color picture processing apparatus 21 is operated by receiving the multi-valued digital input signals GCID,RCID and BCID transferred in parallel from the color picture reading unit 23. A group of the multi-valued digital input signals relating to a remarked pixel is input to the error dispersion processing unit 22 and the achromatic color judging unit 24 in time sequence every operating time. In the error dispersion processing unit 22, the multi-valued digital input signals GCID, RCID and BCID are transformed into pieces of RGB binary data while dispersing errors occurring in the RGB binary data to peripheral pixels adjacent to the remarked pixel. The RGB binary data are classified into a piece of R binary data RVSDA indicating a red component, a piece of G binary data GVSDA indicating a green component and a piece of B binary data BVSDA indicating a blue component. The errors occurring in the binary data are respectively dispersed.

Also, in the achromatic color judging unit 24, the first and second threshold values input to the threshold value selecting circuit 35 are prepared in advance. In detail, a distance from the central line of the hexagonal pyramid R1 to each of vertexes of the cubic coordinates is utilized as a parameter, and the first and second threshold values are respectively determined with the parameters. Thereafter, one of the threshold values is selected as an achromatic judgement threshold value according to the threshold selecting signal. Also, a maximum value A is selected from among digital values of the multi-valued digital input signals GCID,RCID and BCID in the maximum value detecting circuit 31, and a minimum value B is selected from among the digital values of the multi-valued digital input signals GCID,RCID and BCID in the minimum value detecting circuit 32. Thereafter, a difference value A-B is calculated in the difference calculating circuit 33, a calculated result (A-B)/A is obtained in the dividing circuit 34, and the calculated result (A-B)/A is compared with the achromatic judgement threshold value in the comparator 36. In case where the calculated result (A-B)/A is lower than the achromatic judgement threshold value, the digital values of the multi-valued digital input signals GCID,RCID and BCID are close to each other because a difference between the maximum value A and the minimum value B is sufficiently low as compared with the maximum value A. Therefore, an input color indicated by the multi-valued digital input signals GCID,RCID and BCID is placed within the achromatic color judging region, and a compared result obtained in the comparator 36 indicates that the remarked pixel has an achromatic color. In contrast, in case where the calculated result (A-B)/A is equal to or higher than the achromatic judgement threshold value, the digital values of the multi-valued digital input signals GCID,RCID and BCID are not close to each other because a difference between the maximum value A and the minimum value B is high as compared with the maximum value A. Therefore, the input color is placed outside the achromatic color judging region, and a compared result obtained in the comparator 36 indicates that the remarked pixel has a chromatic color.

Thereafter, the compared result indicating that the remarked pixel has an achromatic color or a chromatic color is repeatedly obtained in the comparator 36 in time sequence every operating time. A first compared result obtained at a first operating time is held in the first flip-flop circuit 37 under control of the clock circuit 41, a second compared result obtained at a second operating time preceding to the first operating time is held in the second flip-flop circuit 38 through the first flip-flop circuit 37 under control of the clock circuit 41, and a current compared result is just output from the comparator 36 at a current operating time preceding to the first operating time. Three groups of multi-valued digital input signals GCID,RCID and BCID transferred at the second operating time, the first operating time and the current operating time in that order relate to the same remarked pixel. Thereafter, a logical multiply of the current, first and second compared results is calculated in the AND circuit 39. Therefore, the judgement whether or not the remarked pixel has an achromatic color can be performed according to the logical multiply. Thereafter, the output of the logical multiply is delayed in the timing adjusting circuit 40 to output the logical multiply in synchronization with the RGB binary data output from the error dispersion processing unit 22, and the logical multiply is output as an achromatic color judging signal MOIA (MOIA=0 or 1) to the achromatic color reproducing and color transforming unit 25.

Thereafter, in the achromatic color reproducing and color transforming unit 25, in case where the achromatic color judging signal MOIA indicates that the remarked pixel has an achromatic color (MOIA=1), a piece of achromatic color data KVSDB (KVSDB=0 or 1) indicating a black component is generated and output in place of the RGB binary data to reproduce the black (KVSDB=1) or the white (KVSDB=0) as the achromatic color of the remarked pixel. In this case, the G binary data is utilized as a piece of reference data to determine the value of the achromatic color data KVSDB output in place of the RGB binary data. In case where it is judged that the achromatic color of the remarked pixel is black, the achromatic color data KVSDB=1 is generated and output to reproduce the achromatic color of the remarked pixel. Also, in case where it is judged that the achromatic color of the remarked pixel is white, the achromatic color data KVSDB=0 is generated and output to reproduce the achromatic color of the remarked pixel.

In contrast, in case where the achromatic color judging signal MOIA indicates that the remarked pixel has a chromatic color (MOIA=0), the binary data RVSDA, GVSDA and BVSDA are output as a piece of output binary data RVSDB indicating a reproduced red component, a piece of output binary data GVSDB indicating a reproduced green component and a piece of output binary data BVSDB indicating a reproduced blue component to reproduce the chromatic color of the remarked pixel.

Color transformation theoretical formulas utilized in the achromatic color reproducing and color transforming unit 25 are as follows.

$$RVSB = MOIA*GVSDA + \overline{MOIA}*RVSDA \qquad (14)$$

$$GVSDB = GVSDA \qquad (15)$$

$$BVSDB = MOIA*GVSDA + \overline{MOIA}*BVSDA \qquad (16)$$

$$KVSDB = MOIA*\overline{GVSDA} + \overline{RVSDA*GVSDA*BVSDA} \qquad (17)$$

Here a representative symbol $\overline{X}$ denotes an inverted value of X. A table of transformation codes utilized to perform the color transformation according to the color transformation theoretical formulas is shown in FIGS. 7A and 7B.

FIG. 7A shows a table of transformation codes utilized to transform the RGB binary data RVSDA, GVSDA, BVSDA to the RGB output binary data RVSDB, GVSDB, BVSDB and KVSDB in case where it is judged in the unit 25 that the remarked pixel has an achromatic color (MOIA=1).

As shown in FIG. 7A, when the RGB binary data RVSDA=1, GVSDA=1 and BVSDA=1 are input to the achromatic color reproducing and color transforming unit 25, because the RB data RVSDA and BVSDA are equal to the G data GVSDA utilized as the reference data, the RB data RVSDA and BVSDA are not changed to pieces of inverted data RVSDB=$\overline{RVSDA}$ and BVSDB=$\overline{BVSDA}$, and the RGB binary data are transformed into the RGB output binary data RVSDB=1, GVSDB=1, BVSDB=1. Because a group of the RGB output binary data RVSDB=1, GVSDB=1, BVSDB=1 indicates the white, the achromatic color data KVSDB set to zero is output. That is, a printing paper is not printed with any color ink or black ink in a printer (not shown).

When the RGB binary data RVSDA=1, GVSDA=0 and BVSDA=0 are input to the achromatic color reproducing and color transforming unit 25, because the R data RVSDA is not equal to the G data GVSDA utilized as the reference data, the R data RVSDA is changed to a piece of inverted data RVSDB=$\overline{RVSDA}$, and the RGB binary data are transformed into the RGB output binary data RVSDB=0, GVSDB=0, BVSDB=0. Because a group of the RGB output binary data RVSDB=0, GVSDB=0, BVSDB=0 indicates the black, the achromatic color data KVSDB is generated (KVSDB=1) and output to reproduce the achromatic color of the remarked pixel.

When the RGB binary data RVSDA=0, GVSDA=1 and BVSDA=0 are input to the achromatic color reproducing and color transforming unit 25, because the RB data RVSDA and BVSDA are not equal to the G data GVSDA utilized as the reference data, the RB data RVSDA and BVSDA are changed to pieces of inverted data RVSDB=$\overline{RVSDA}$ and BVSDB=$\overline{BVSDA}$, and the RGB binary data are transformed into the RGB output binary data RVSDB=1, GVSDB=1, BVSDB=1. Because a group of the RGB output binary data RVSDB=1, GVSDB=1, BVSDB=1 indicates the white, the achromatic color data KVSDB set to zero is output. That is, a printing paper is not printed with any color ink or black ink in a printer (not shown).

In the same manner, when the RGB binary data RVSDA=0, GVSDA=0 and BVSDA=1, the RGB binary data RVSDA=1, GVSDA=0 and BVSDA=1, or the RGB binary data RVSDA=0, GVSDA=0 and BVSDA=0 are input, the RGB binary data are transformed into the RGB output binary data RVSDB=0, GVSDB=0, BVSDB=0, the achromatic color data KVSDB is generated (KVSDB=1) and output to print a printing paper with a black ink in a printer (not shown). When the RGB binary data RVSDA=1, GVSDA=1 and BVSDA=0 or the RGB binary data RVSDA=0, GVSDA=1 and BVSDA=1 are input, the RGB binary data are transformed into the RGB output binary data RVSDB=1, GVSDB=1, BVSDB=1, the achromatic color data KVSDB set to zero is output.

FIG. 7B shows a table of transformation codes utilized to transform the RGB binary data RVSDA, GVSDA, BVSDA to the RGB output binary data RVSDB, GVSDB, BVSDB and KVSDB in case where it is judged in the unit 25 that the remarked pixel has a chromatic color (MOIA=0).

As shown in FIG. 7B, the RGB binary data RVSDA, GVSDA, BVSDA are output as the RGB output binary data RVSDB, GVSDB and BVSDB without any color transformation. In this case, the achromatic color data KVSDB set to zero is output. Therefore, a printing paper is not printed with a black ink, but the printing paper is printed with one or more types of color ink corresponding to the RGB output binary data RVSDB, GVSDB and BVSDB set to 1 in a printer (not shown).

Accordingly, because the achromatic color region R1 is defined in the RGB system and the CMY system, it can be easily judged whether the remarked pixel has an achromatic color or a chromatic color. Therefore, a color picture processing can be easily performed by utilizing the multi-valued digital input signals GCID,RCID and BCID, and a configuration of the color picture processing apparatus 21 can be simplified.

Also, because the achromatic color region R1 is widened on the side of a high lightness region, the color picture processing apparatus 21 is useful for a printer used for reproducing colors defined in the CMY system. That is, because little attention is given to the reproduction of colors placed near to the black in the printer, the printer operated with the color picture processing apparatus 21 can be useful.

Also, because the first and second threshold values input to the threshold value selecting circuit 35 are respectively determined with the parameters which indicate the distances from the central line of the hexagonal pyramid R1 to the vertexes of the cubic coordinates, in case where either the first and second threshold values is selected as the achromatic judgement threshold value for each of the color pictures of pixels, a superior color picture can be reproduced.

Next, a second embodiment according to the present invention is described.

Figure 8:
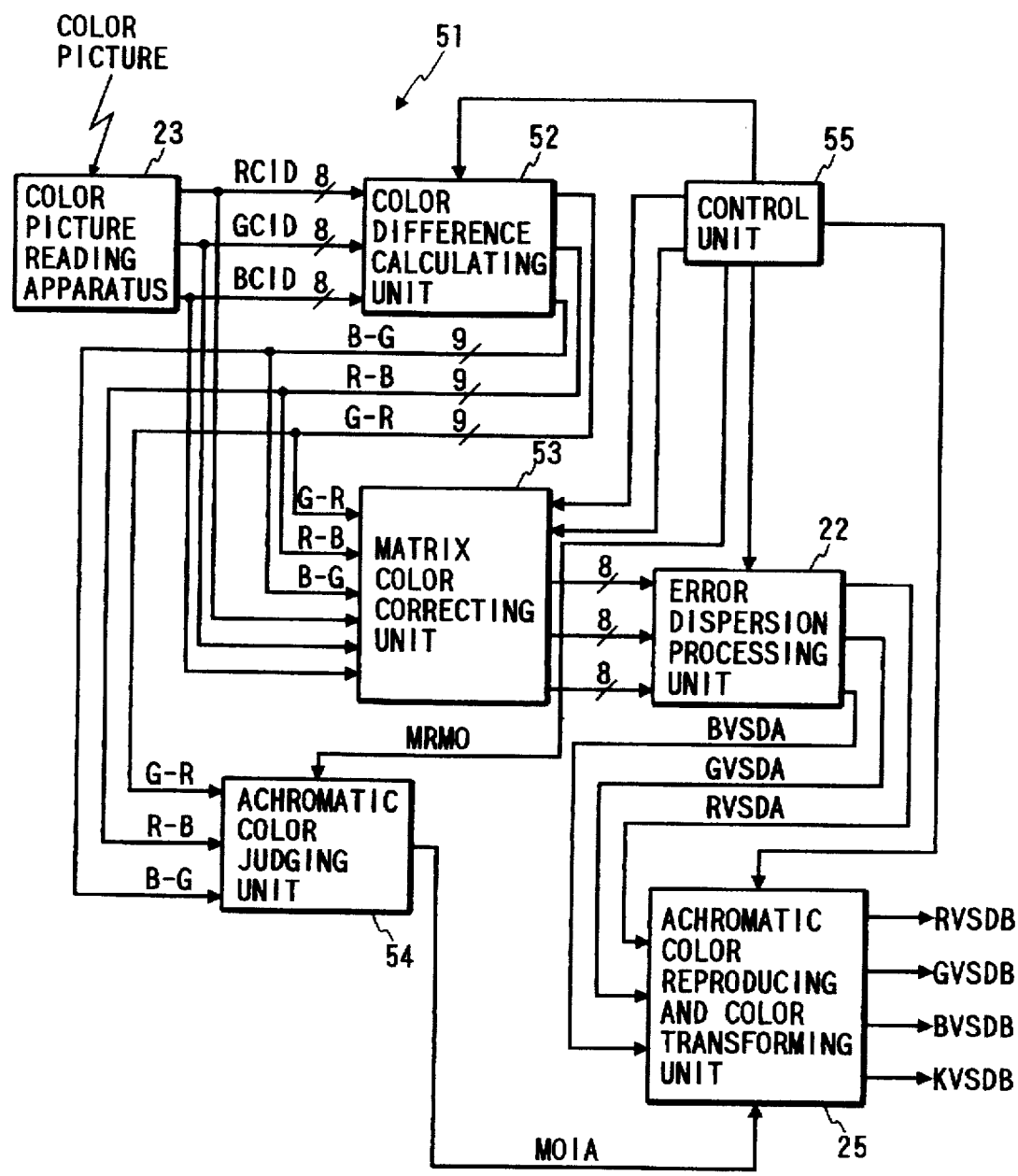
FIG. 8 is a block diagram of a color picture processing apparatus according to a second embodiment of the present invention.

FIG. 8 is a block diagram of a color picture processing apparatus according to the second embodiment.

As shown in FIG. 8, a color picture processing apparatus 51 comprises a color difference calculating unit 52 for receiving the group of the RGB multi-valued digital input signals RCID, GCID and BCID which is obtained every operating time by reading a color picture of an remarked pixel in the same manner as in the first embodiment and for generating a G-R color difference signal, a R-B color difference signal and a B-G color difference signal in time sequence, a matrix color correcting unit 53 for correcting the multi-valued digital input signals GCID, RCID and BCID according to the color difference signals to perform the correction of the color picture and for outputting three corrected color picture signals, the error dispersion processing unit 22 for transforming the corrected color picture signals into pieces of RGB binary data classified into a piece of R binary data, a piece of G binary data and a piece of B binary data while dispersing errors occurring in the RGB binary data, an achromatic color judging unit 54 for judging whether the remarked pixel has an achromatic color or a chromatic color according to the color difference signals, the achromatic color reproducing and color transforming unit 25 for generating and outputting pieces of achromatic color data KVSDA according to the RGB binary data transformed in the error dispersion processing unit 22 in case where it is judged by the achromatic color judging unit 54 that the remarked pixel has an achromatic color and for outputting the RGB binary data GVSDA, RVSDA and BVSDA in case where it is judged by the achromatic color judging unit 54 that the remarked pixel has a chromatic color, and a control unit 55 for controlling the color difference calculating unit 52, the matrix color correcting unit 53, the error dispersion processing unit 22, the achromatic color judging unit 54, and the achromatic color reproducing and color transforming unit 25.

The configuration in the error dispersion processing unit 22 and the achromatic color reproducing and color transforming unit 25 is the same as that in the first embodiment.

A color transformation method (or a linear masking method according to a linear first-order transformation) adopted in the matrix color correcting unit 53 of the color picture processing apparatus 51 according to the second embodiment is described before the configuration of the matrix color correcting unit 53 is described.

A color transformation method in which a 3×3 color transforming matrix is utilized is well-known because the color transformation can be easily performed. However, elements of the color transforming matrix are arbitrarily determined, there is a case that an achromatic color is undesirably transformed into a chromatic color. Therefore, elements of the color transforming matrix are generally determined to set the eigen value of the color transforming matrix to 1. The color transforming matrix in which the eigen value is set to 1 is expressed as follows.

$$\begin{bmatrix} 1-M_{12}-M_{13} & M_{12} & M_{13} \\ M_{21} & 1-M_{21}-M_{31} & M_{23} \\ M_{31} & M_{32} & 1-M_{31}-M_{32} \end{bmatrix} \text{ (matrixA)}$$

Therefore, the multi-valued digital input signals RCID, GCID and BCID having the digital values Rin, Gin and Bin are transformed into the corrected color picture signals having digital values Rout, Gout and Bout in the matrix color correcting unit 53 according to an equation (18).

$$\begin{bmatrix} Rout \\ Gout \\ Bout \end{bmatrix} = \begin{bmatrix} 1-M_{12}-M_{13} & M_{12} & M_{13} \\ M_{21} & 1-M_{21}-M_{31} & M_{23} \\ M_{31} & M_{32} & 1-M_{31}-M_{32} \end{bmatrix} \times \begin{bmatrix} Rin \\ Gin \\ Bin \end{bmatrix} \quad (18)$$

That is, the relation: (output signals color-transformed)=(the color transforming matrix)×(input signals) is satisfied. When the equation (18) is expanded and rearranged, equations (19) to (21) are obtained.

$$Rout=Rin+(Gin-Rin) \times M_{12}+(Rin-Bin) \times (-M_{13}) \quad (19)$$

$$Gout=(Gin-Rin) \times (-M_{21})+Gin+(Bin-Gin) \times M_{23} \quad (20)$$

$$Bout=(Rin-Bin) \times M_{31}+(Bin-Gin) \times (-M_{32})+Bin \quad (21)$$

To simplify the equations (19) to (21), equations (22) to (27) are defined.

$$(Gin-Rin) \times M_{12}=D_{12} \quad (22)$$

$$(Rin-Bin) \times (-M_{13})=D_{13} \quad (23)$$

$$(Gin-Rin) \times (-M_{21})=D_{21} \quad (24)$$

$$(Bin-Gin) \times M_{23}=D_{23} \quad (25)$$

$$(Rin-Bin) \times M_{31}=D_{31} \quad (26)$$

$$(Bin-Gin) \times (-M_{32})=D_{32} \quad (27)$$

Therefore, the equations (19) to (21) can be rewritten by substituting the equations (22) to (27) into the equations (19) to (21).

$$Rout=Rin+D_{12}+D_{13} \quad (28)$$

$$Gout=Gin+D_{21}+D_{23} \quad (29)$$

$$Bout=Bin+D_{31}+D_{32} \quad (30)$$

In the second embodiment, the multi-valued digital input signals RCID, GCID and BCID having the digital values Rin, Gin and Bin are transformed into the corrected color picture signals having the digital values Rout, Gout and Bout according to the equations (28) to (30) in the matrix color correcting unit 53.

Figure 9:
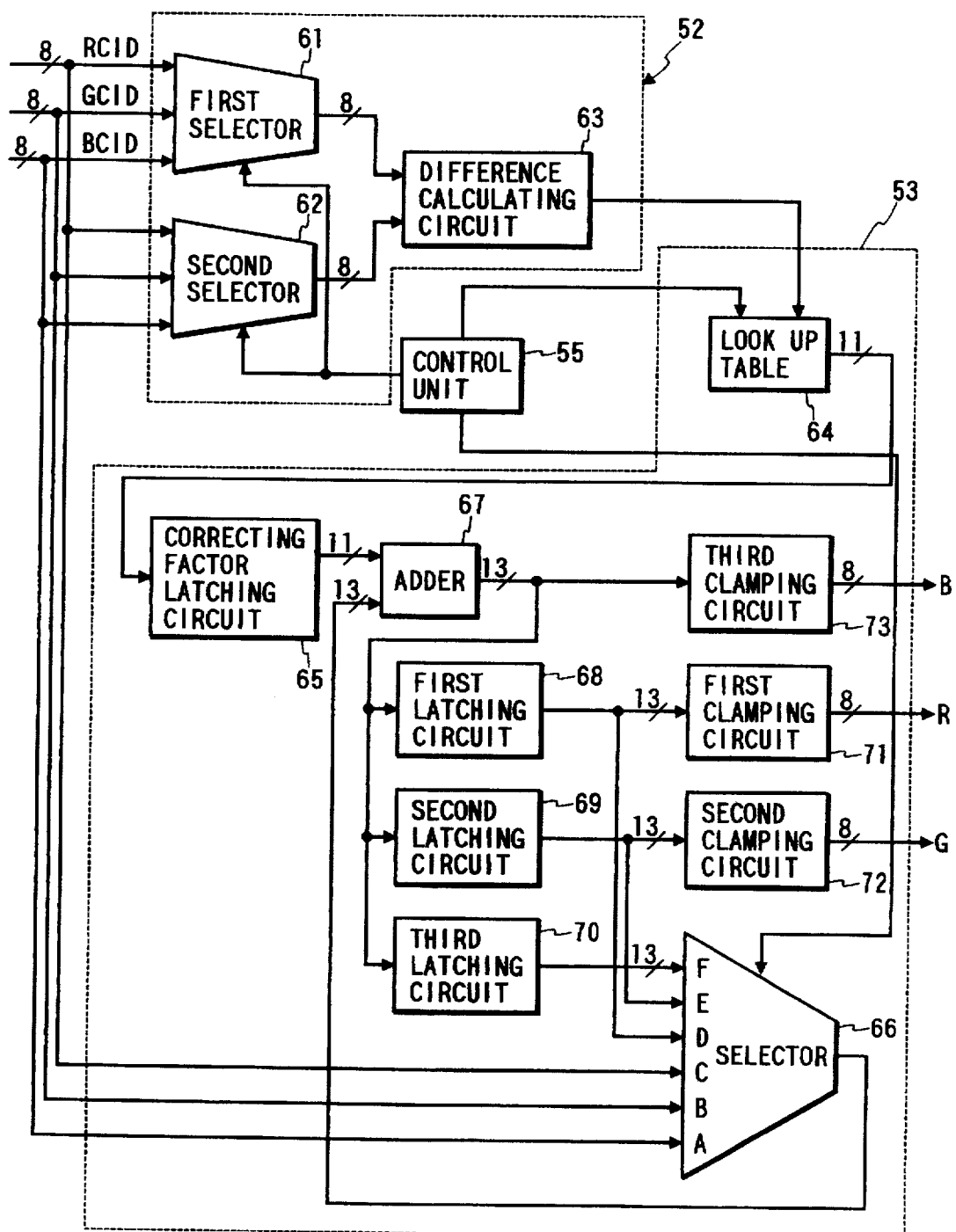
FIG. 9 is a block diagram of a color difference calculating unit and a matrix color correcting unit shown in FIG. 8.

FIG. 9 is a block diagram of the color difference calculating unit 52 and the matrix color correcting unit 53.

As shown in FIG. 9, the color difference calculating unit 52 comprises a first selector 61 for selecting the multi-valued digital input signal GCID, the multi-valued digital input signal RCID and the multi-valued digital input signal BCID in that order from among the multi-valued digital input signals, a second selector 62 for selecting the multi-valued digital input signal RCID, the multi-valued digital input signal BCID and the multi-valued digital input signal GCID from among the multi-valued digital input signals, and a difference calculating circuit 63 for calculating a first difference value Gin−Rin between digital values Gin and Rin of the multi-valued digital input signals GCID and RCID selected in the selectors 61 and 62, a second difference value Rin−Bin between digital values Rin and Bin of the multi-valued digital input signals RCID and BCID selected in the selectors 61 and 62 and a third difference value Bin−Gin between the digital values Bin and Gin of the multi-valued digital input signals BCID and GCID selected in the selectors 61 and 62 and outputting the G-R color difference signal having the value Gin−Rin, the R-B color difference signal having the value Rin−Bin and the B-G color difference signal having the value Bin−Gin in time sequence.

The matrix color correcting unit 53 comprises a look-up table 64 made of a read only memory for storing a plurality of matrix correcting factors and outputting a matrix correcting factor specified by one of the color difference signals transferred from the difference calculating circuit 63 in time sequence and a selecting signal transferred from the control unit 55, a correcting factor latching circuit 65 for holding each of matrix correcting factors transferred from the look-up table 64 in time sequence, a selector 66 for selecting the digital value Rin of the multi-valued digital input signal RCID input to an input terminal A in a first cycle, the digital value Gin of the multi-valued digital input signal GCID input to an input terminal B in a second cycle, the digital value Bin of the multi-valued digital input signal BCID input to an input terminal C in a third cycle, a digital value input to an input terminal D in a fourth cycle, a digital value input to an input terminal E in a fifth cycle and a digital value input to an input terminal F in a sixth cycle in that order, an adder 67 for adding a matrix correcting factor held in the correcting factor latching circuit 65 and a digital value selected by the selector 66, a first latching circuit 68 for holding an added value obtained in the adder 67 in the first or fourth cycle, a second latching circuit 69 for holding an added value obtained in the adder 67 in the second or fifth cycle, a third latching circuit 70 for holding an added value obtained in the adder 67 in the third cycle, a first clamping circuit 71 for rounding the added value held in the first latching circuit 68 in the fourth cycle to change the added value indicated by a nine or more bit length to a first rounded value indicated by an eight-bit length, a second clamping circuit 72 for rounding the added value held in the second latching circuit 69 in the fifth cycle to change the added value indicated by a nine or more bit length to a second rounded value indicated by an eight-bit length, and a third clamping circuit 73 for rounding the added value obtained in the adder 67 in the sixth cycle to a third rounded value. The first rounded value rounded in the first clamping circuit 71 is input to the processing unit 22 as a R corrected color picture signal, the second rounded value rounded in the second clamping circuit 72 is input to the processing unit 22 as a G corrected color picture signal, and the third rounded value rounded in the third clamping circuit 72 is input to the processing unit 22 as a B corrected color picture signal.

Next, an achromatic color judging method performed in the achromatic color judging unit 54 is described before the configuration of the achromatic color judging unit 54 is described.

Figure 10:
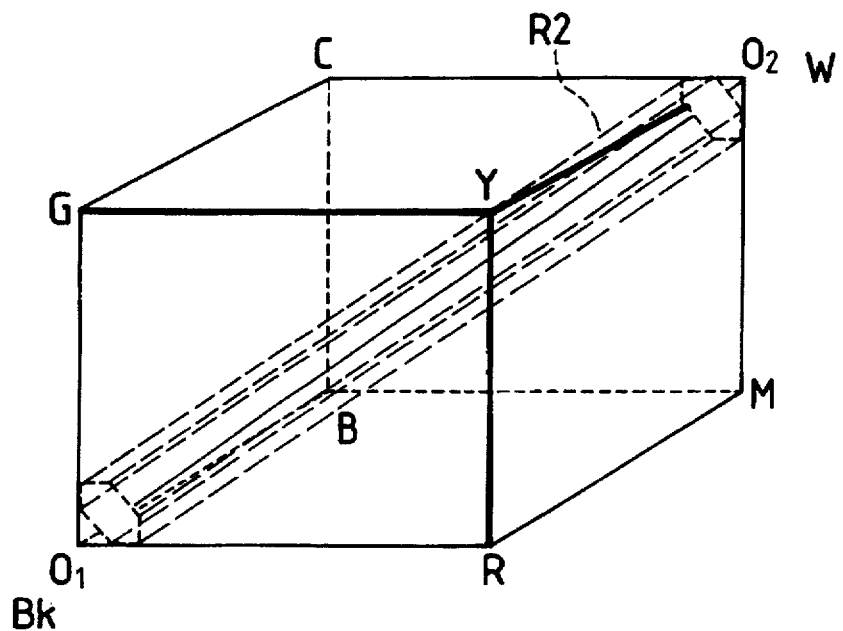
FIG. 10 is a model view explanatorily showing a principle of an achromatic color judging method performed in the achromatic color judging unit shown in FIG. 8.

FIG. 10 is a model view explanatorily showing a principle of an achromatic color judging method performed in the achromatic color judging unit 54.

As shown in FIG. 10, a color space in which all of colors defined in a RGB color system and a CMY color system are placed is expressed by cubic coordinates in the same manner as those shown in the FIG. 5, and an achromatic color region in the color space is specified according to a simple color difference considering method of the achromatic color judging method.

In the simple color difference considering method, an achromatic color region R2 in which many colors (R,G,B) equivalent to the achromatic color are placed is defined on condition that an equation (31) is satisfied.

$$|R-G| \leq S2, |G-B| \leq S2, |B-R| \leq S2 \qquad (31)$$

Here the symbol S2 denotes a range of the achromatic color region R2.

The achromatic color region R2 defined according to the equation (31) corresponds to an internal region of a hexagonal prism R2 in which a central axis is equal to a diagonal line connecting the original point $O_1$ (red, green and blue components are respectively zero) and the original point $O_2$ (red, green and blue components are respectively maximized to a value 255 in an eight bit expression).

Figure 11:
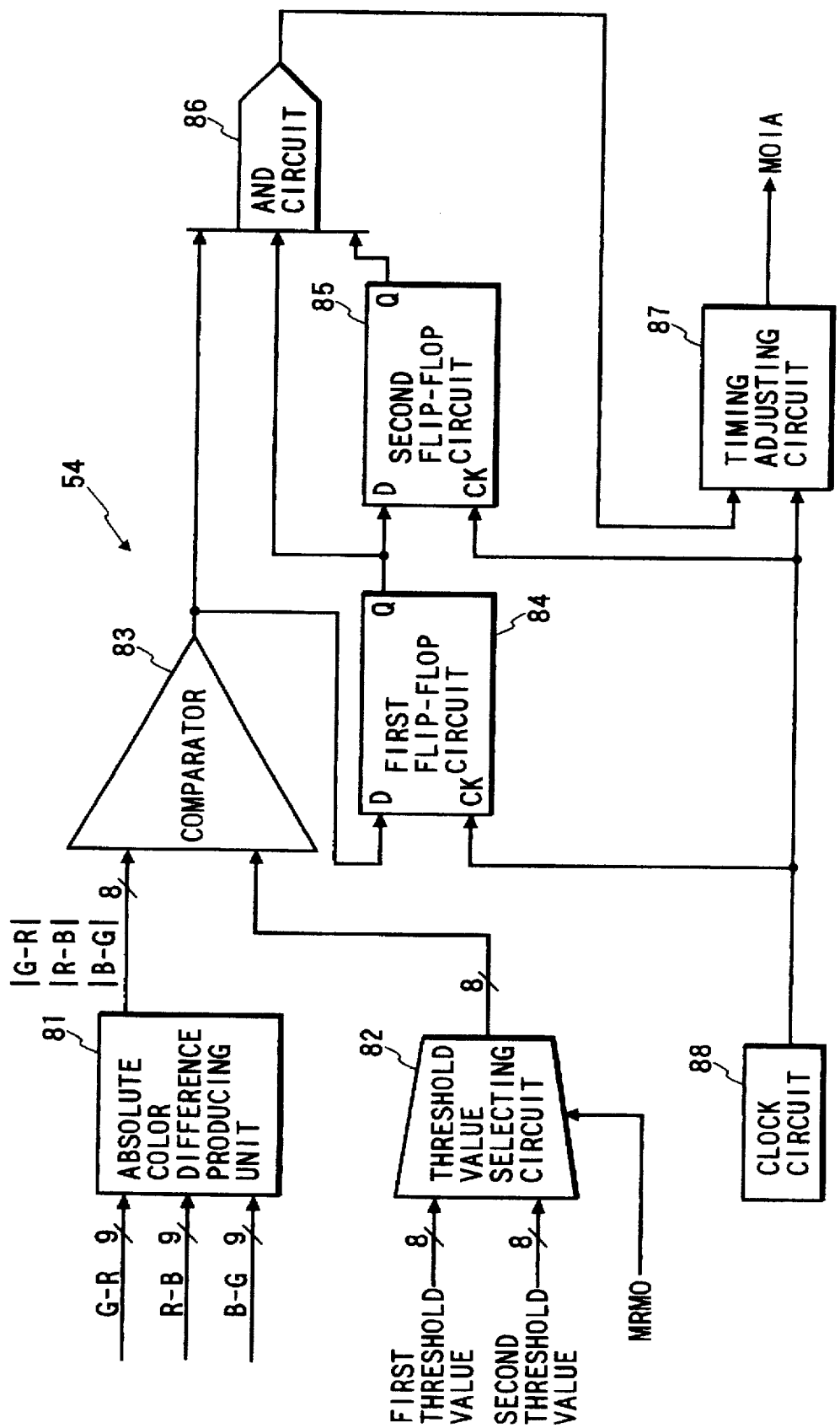
FIG. 11 is a block diagram of an achromatic color judging unit formed in an absolute color difference type.

FIG. 11 is a block diagram of the achromatic color judging unit 54 formed in an absolute color difference type.

As shown in FIG. 11, the achromatic color judging unit 54 comprises an absolute color difference producing circuit 81 for producing absolute values |Gin−Rin|, |Rin−Bin| and |Bin−Gin| of the G-R color difference signal, the R-B color difference signal and the B-G color difference signal transferred in time sequence from the color difference calculating unit 52, a threshold value selecting circuit 82 for selecting an achromatic judgement threshold value from a first threshold value and a second threshold value according to a threshold selecting signal MRMO transferred from the control unit 55, a comparator 83 for comparing the absolute values |Gin−Rin|, |Rin−Bin| and |Bin−Gin| with the achromatic judgement threshold value in time sequence and outputting a first compared result for the absolute value |Gin−Rin|, a second compared result for the absolute value |Rin−Bin| and a third compared result for the absolute value |Bin−Gin| in that order, a first flip-flop circuit 84 for holding the second compared result after the first compared result is held, a second flip-flop circuit 85 for holding the first compared result transferred from the first flip-flop circuit 84, an AND circuit 86 for calculating a logical multiply of the second compared result held in the first flip-flop circuit 84, the first compared result held in the second flip-flop circuit 85 and the third compared result currently output from the comparator 83, a timing adjusting circuit 87 for outputting the logical multiply as an achromatic color judging signal MOIA in synchronization with the RGB binary data output from the error dispersion processing unit 22 while adjusting the time delay resulting from an operating time required in the error dispersion processing unit 22, and a clock circuit 88 for controlling the operation timing of the flip-flop circuits 84, 85 and the timing adjusting circuit 87 for an achromatic color judging processing.

The operation of the color picture processing apparatus 51 is described.

The color picture processing apparatus 21 is operated by receiving the multi-valued digital input signals GCID,RCID and BCID transferred in parallel from the color picture reading unit 23, in the same manner as in the first embodiment. When the multi-valued digital input signals GCID, RCID and BCID are input to the color difference calculating unit 52, the G-R color difference signal having the value Gin−Rin, the R-B color difference signal having the value Rin−Bin and the B-G color difference signal having the value Bin−Gin are output to the matrix color correcting unit 53 and the achromatic color judging unit 54 in time sequence by operating the selectors 61, 62 and the difference calculating circuit 63. In detail, an operating period for each of pixels is divided into four divided operating periods. The selection of the multi-valued digital input signal GCID in the first selector 61 and the selection of the multi-valued digital input signal RCID in the second selector 62 are performed in a first divided operating period, and the G-R color difference signal are output. Also, the multi-valued digital input signals RCID and BCID are selected in a second divided operating period, and the R-B color difference signal are output. Also, the multi-valued digital input signals BCID and GCID are selected in a third divided operating period, and the B-G color difference signal are output. In a fourth divided operating period, though the B-G color difference signal are also output, the B-G color difference signal is disregarded in the matrix color correcting unit 53. Each of the color difference signals has a nine bit length, and a most significant bit (MSB) of each of the color difference signals is utilized as a sign bit.

In the matrix color correcting unit 53, the corrected color picture signals having the digital values Rout, Gout and Bout are produced by utilizing the color difference signals and a series of selecting signals transferred from the control unit 55 according to a linear masking method. In detail, each of the selecting signals indicates one of six matrix elements $M_{12}, M_{21}, M_{31}, M_{13}, M_{23}$ and $M_{32}$ in the color transforming matrix. Also, because each of the matrix correcting factors $D_{12}$ to $D_{32}$ varies with a corresponding color difference signal, values of each of the matrix correcting factors varying with a corresponding color difference signal are calculated in advance and stored in the look up table 64.

FIG. 12 shows an LUT address map of the matrix correcting factors $D_{12}$ to $D_{32}$ stored in the look up table 64.

As shown in FIG. 12, each of values of a matrix correcting factor is allocated to an LUT address having a twelve bit length in the look up table 64, an upper three-bit portion of each LUT address is specified by a selecting signal transferred from the control unit 55, and a lower nine-bit portion of each LUT address is specified by a color difference signal transferred from the difference calculating circuit 63. Each of the matrix correcting factors is stored in one of six factor regions in the look up table 64, and 512 values of each matrix correcting factor are stored in a factor region. For example, when the G-R color difference signal having the value Gin-Rin and a selecting signal indicating a matrix element $M_{12}$ are transferred to the look up table 64, a matrix correcting factor $D_{12}$ of which a value is determined according to the equation (22) is output from the look up table to the correcting factor latching circuit 65. In this embodiment, six matrix correcting factors $D_{12}$, $D_{21}$, $D_{31}$, $D_{13}$, $D_{23}$ and $D_{32}$ of which values are determined according to the equations (22) to (27) are output in that order in time sequence according to the combined signals.

In a first cycle, the matrix correcting factor $D_{12}$ is held in the correcting factor latching circuit 65, the multi-valued digital input signal RCID is selected in the selector 66, an added value Rin+$D_{12}$ is generated in the adder 67 and is held in the first latching circuit 68. In a second cycle, the matrix correcting factor $D_{21}$ is held in the correcting factor latching circuit 65, the multi-valued digital input signal GCID is selected in the selector 66, an added value Gin+$D_{21}$ is generated in the adder 67 and is held in the second latching circuit 69. In a third cycle, the matrix correcting factor $D_{31}$ is held in the correcting factor latching circuit 65, the multi-valued digital input signal BCID is selected in the selector 66, an added value Bin+$D_{31}$ is generated in the adder 67 and is held in the third latching circuit 70. In a fourth cycle, the matrix correcting factor $D_{13}$ is held in the correcting factor latching circuit 65, the added value Rin+$D_{12}$ transferred from the first latching circuit 68 is selected in the selector 66, an added value Rin+$D_{12}$+$D_{13}$ is generated in the adder 67 and is held in the first latching circuit 68. In a fifth cycle, the matrix correcting factor $D_{23}$ is held in the correcting factor latching circuit 65, the added value Gin+$D_{21}$ transferred from the second latching circuit 69 is selected in the selector 66, an added value Gin+$D_{21}$+$D_{23}$ is generated in the adder 67 and is held in the second latching circuit 69. In a sixth cycle, the matrix correcting factor $D_{32}$ is held in the correcting factor latching circuit 65, the added value Bin+$D_{31}$ transferred from the third latching circuit 70 is selected in the selector 66, an added value Bin+$D_{31}$+$D_{32}$ is generated in the adder 67. Thereafter, the added value Rin+$D_{12}$+$D_{13}$ held in the first latching circuit 68 is rounded in the first clamping circuit 71 to form a R corrected color picture signal having an eight bit length (the MSB corresponds to a sign bit), the added value Gin+$D_{21}$+$D_{23}$ held in the second latching circuit 69 is rounded in the second clamping circuit 72 to form a G corrected color picture signal having an eight bit length (the MSB corresponds to a sign bit), and the added value Bin+$D_{31}$+$D_{32}$ currently generated in the adder 67 is rounded in the third clamping circuit 73 to form a B corrected color picture signal having an eight bit length (the MSB corresponds to a sign bit). Thereafter, the corrected color picture signals having the digital values Rin+$D_{12}$+$D_{13}$, Gin+$D_{21}$+$D_{23}$ and Bin+$D_{31}$+$D_{32}$ are output to the error dispersion processing unit 22 in synchronization with each other.

In the error dispersion processing unit 22, each of the corrected color picture signals is converted into a piece of binary data by judging whether or not each of the corrected color picture signals is higher than a slice level while an error occurring in the binary data is dispersed to peripheral pixels adjacent to the remarked pixel. The RGB binary data are produced without any connection with each other and are output to the achromatic color reproducing and color transforming unit 25.

In the achromatic color judging unit 54, the first and second threshold values input to the threshold value selecting circuit 82 are prepared in advance. In detail, a distance from the central line of the hexagonal pyramid R2 to each of vertexes of the cubic coordinates is utilized as a parameter, and the first and second threshold values are respectively determined with the parameters. Thereafter, one of the threshold values is selected as an achromatic judgement threshold value according to the threshold selecting signal transferred from the control unit 55. Also, absolute values |Gin-Rin|, |Rin-Bin| and |Bin-Gin| of the G-R color difference signal, the R-B color difference signal and the B-G color difference signal transferred in time sequence from the color difference calculating unit 52 are produced in the absolute color difference producing circuit 81 and are compared with the achromatic judgement threshold value in the comparator 83 in time sequence.

Thereafter, three compared results respectively indicating whether or not an absolute value obtained in the absolute color difference producing circuit 81 is lower than the achromatic judgement threshold value are obtained in the comparator 83 in time sequence. A first compared result corresponding to the G-R color difference signal is held in the second flip-flop circuit 85 under control of the clock circuit 41 after the first compared result is held in the first flip-flop circuit 84, a second compared result corresponding to the R-B color difference signal is held in the first flip-flop circuit 84 under control of the clock circuit 88, and a third compared result corresponding to the B-G color difference signal is currently output from the comparator 83. Thereafter, a logical multiply of the first, second and third compared results is calculated in the AND circuit 86. Therefore, when all of the absolute values |Gin-Rin|, |Rin-Bin| and |Bin-Gin| are lower than the achromatic judgement threshold value, the logical multiply indicates that the remarked pixel has an achromatic color. In contrast, when all of the absolute values |Gin-Rin|, |Rin-Bin| and |Bin-Gin| are not lower than the achromatic judgement threshold value, the logical multiply indicates that the remarked pixel has a chromatic color. Thereafter, the output of the logical multiply is delayed in the timing adjusting circuit 87 to output the logical multiply in synchronization with the RGB binary data output from the error dispersion processing unit 22, and the logical multiply is output as an achromatic color judging signal MOIA to the achromatic color reproducing and color transforming unit 25.

In the achromatic color reproducing and color transforming unit 25, the RGB binary data transferred from the error dispersion processing unit 22 are transformed into the achromatic color data KVSDA to reproduce the achromatic color of the remarked pixel in case where the achromatic color judging signal MOIA indicates that the remarked pixel has an achromatic color, and the achromatic color data KVSDA is output. In contrast, in case where the achromatic color judging signal MOIA indicates that the remarked pixel has a chromatic color, the RGB binary data are output as the binary data GVSDA, RVSDA and BVSDA to reproduce the chromatic color of the remarked pixel.

Accordingly, because the achromatic color region R2 is defined in the RGB system and the CMY system, it can be easily judged whether the remarked pixel has an achromatic color or a chromatic color. Therefore, a color picture processing can be easily performed by utilizing the multi-valued digital input signals GCID,RCID and BCID, and a configuration of the color picture processing apparatus 51 can be simplified.

Also, because the first and second threshold values input to the threshold value selecting circuit 82 are respectively determined with the parameters which indicate the distances from the central line of the hexagonal pyramid R2 to the vertexes of the cubic coordinates, in case where either the first and second threshold values is selected as the achromatic judgement threshold value for each of the color pictures of pixels, a superior color picture can be reproduced.

Also, because all of values of the matrix correcting factors $D_{12}$, $D_{21}$, $D_{31}$, $D_{13}$, $D_{23}$ and $D_{32}$ varying with the color difference signals are stored in advance in the look up table 64, any multiplier for calculating values Rout, Gout and Bout of the corrected color picture is not requited. Therefore, the color picture processing apparatus 51 can be down-sized.

A modification of the first embodiment in which the achromatic color judging unit 24 is modified is described.

The equation (13) can be rewritten to an equation (32).

$$\{Max(|R-G|, |G-B|, |B-R|)\}/Max(R,G,B) \leq S1 \qquad (32)$$

When M=Max(R,G,B) is defined, the equation (32) can be rewritten to an equation (33).

$$|R-G| \leq S1*M, \ |G-B| \leq S1*M, \ |B-R| \leq S1*M \qquad (33)$$

Figure 13:
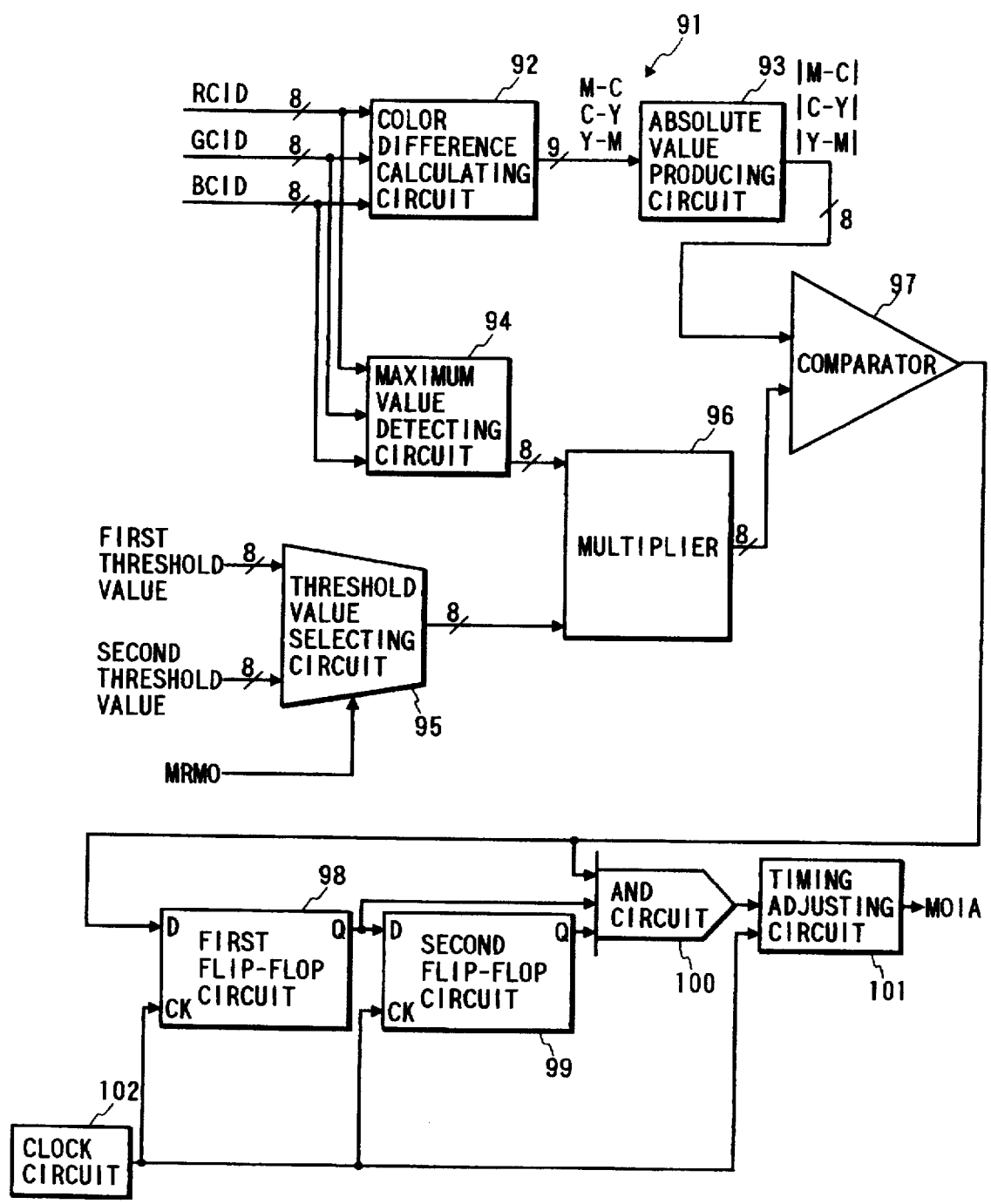
FIG. 13 is a block diagram of an achromatic color judging unit in which an achromatic color judging method is performed according to an equation (33)

FIG. 13 is a block diagram of an achromatic color judging unit in which an achromatic color judging method is performed according to the equation (33).

As shown in FIG. 13, an achromatic color judging unit 91 comprises a color difference calculating circuit 92 for receiving the RGB multi-valued digital input signals GCID, RCID and BCID read in the color picture reading unit 23 and calculating a difference value Gin–Rin between digital values of the input signals GCID and RCID, a difference value Rin–Bin between digital values of the input signals RCID and BCID and a difference value Bin–Gin between digital values of the input signals BCID and GCID in time sequence, an absolute value producing circuit 93 for producing absolute values |Gin–Rin|, |Rin–Bin| and |Bin–Gin| of the difference values Gin–Rin, Rin–Bin and Bin–Gin, a maximum value detecting circuit 94 for detecting a maximum value among the values Rin, Gin and Bin of the RGB multi-valued digital input signals, a threshold value selecting circuit 95 for selecting an achromatic judgement threshold value from a first threshold value and a second threshold value according to a threshold selecting signal MRMO transferred from the control unit 55, a multiplier 96 for multiplying the maximum value by the achromatic judgement threshold value to obtain a product value, a comparator 97 for comparing the absolute values |Gin–Rin|, |Rin–Bin| and |Bin–Gin| with the product value in time sequence to obtain a first compared result, a second compared result and a third compared result in that order, a first flip-flop circuit 98 for holding the second compared result after the first compared result is held, a second flip-flop circuit 99 for holding the first compared result transferred from the first flip-flop circuit 98, an AND circuit 100 for calculating a logical multiply of the second compared result held in the first flip-flop circuit 98, the first compared result held in the second flip-flop circuit 99 and the third compared result currently output from the comparator 97, a timing adjusting circuit 101 for outputting the logical multiply as an achromatic color judging signal MOIA in synchronization with the RGB binary data output from the error dispersion processing unit 22 while adjusting the time delay resulting from an operating time required in the error dispersion processing unit 22, and a clock circuit 102 for controlling the operation timing of the flip-flop circuits 98, 99 and the timing adjusting circuit 101 for an achromatic color judging processing.

Accordingly, because the achromatic color region S1 is defined in the RGB system and the CMY system, it can be easily judged whether the remarked pixel has an achromatic color or a chromatic color, and a configuration of a color picture processing apparatus according to the modification of the first embodiment can be simplified.

Also, because the achromatic color region S1 is widened on the side of a high lightness region, the color picture processing apparatus is useful for a printer used for reproducing colors defined in the CMY system.

In the second embodiment, the matrix color correcting unit 53 shown in FIG. 9 is utilized. However, the present invention is not limited to the matrix color correcting unit 53 having the look up table 64.

Figure 14:
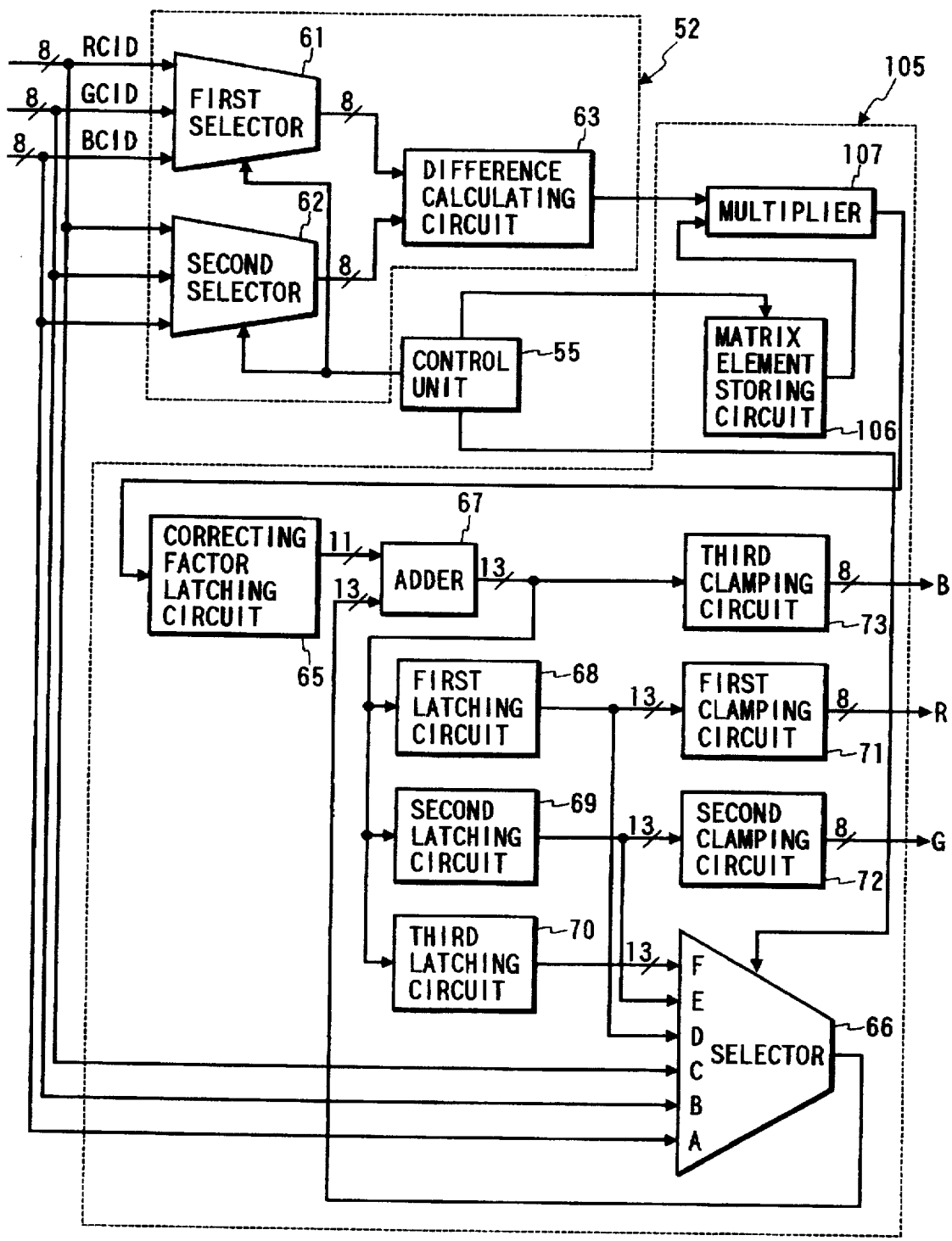
FIG. 14 is a block diagram of the color difference calculating unit and a matrix color correcting unit according to a modification of the second embodiment.

FIG. 14 is a block diagram of the color difference calculating unit 52 and a matrix color correcting unit according to a modification of the second embodiment.

As shown in FIG. 14, a matrix color correcting unit 105 comprises a matrix element storing circuit 106 for storing the matrix elements $M_{12}, M_{21}, M_{31}, M_{13}, M_{23}$ and $M_{32}$ of the color transforming matrix, a multiplier 107 for multiplying each of the color difference signals transferred from the difference calculating circuit 63 by one of the matrix elements $M_{12}, M_{21}, M_{31}, M_{13}, M_{23}$ and $M_{32}$ stored in the storing circuit 106 to produce the matrix correcting factors $D_{12}, D_{21}, D_{31}, D_{13}, D_{23}$ and $D_{32}$ according to the equation (22) to (27), the correcting factor latching circuit 65 for holding each of matrix correcting factors transferred from the multiplier 107 in time sequence, the selector 66, the adder 67, the first latching circuit 68, the second latching circuit 69, the third latching circuit 70, the first clamping circuit 71, the second clamping circuit 72 and the third clamping circuit 73.

In the above configuration, the matrix elements $M_{12}, M_{21}, M_{31}, M_{13}, M_{23}$ and $M_{32}$ of the color transforming matrix are stored in the matrix element storing circuit 106 in advance. When the color difference signals having the digital values Gin–Rin, Rin–Bin and Bin–Gin are transferred from the difference calculating circuit 63 to the multiplier 107 in time sequence, the matrix elements $M_{12}, M_{21}, M_{31}, M_{13}, M_{23}$ and $M_{32}$ are output from the storing circuit 106 to the multiplier 107 under the control of the control unit 55, and the matrix correcting factors $D_{12}, D_{21}, D_{31}, D_{13}, D_{23}$ and $D_{32}$ are produced and output to the correcting factor latching circuit 65 in time sequence.

Accordingly, the number of matrix elements stored in the storing circuit 106 is considerable reduced as compared with the number of values of the matrix correcting factors $D_{12}, D_{21}, D_{31}, D_{13}, D_{23}$ and $D_{32}$, a memory capacity of the storing circuit 106 can be considerably reduced as compared with that of the look up table 64. Therefore, in case where the matrix color correcting unit 105 is utilized in the color picture processing unit 51, even though a memory capacity is low in the matrix color correcting unit 105, a color picture of a remarked pixel can be processed in the color picture processing unit 51.

In the first embodiment, the achromatic color judging units 24, 91 formed in a maximum value and minimum value detecting type is described, and the achromatic color judging unit 54 formed in an absolute color difference type is described in the second embodiment. However, the present invention is not limited to the unit 24, 54 or 91.

An achromatic color judging method according to a third embodiment is described.

Figure 15:
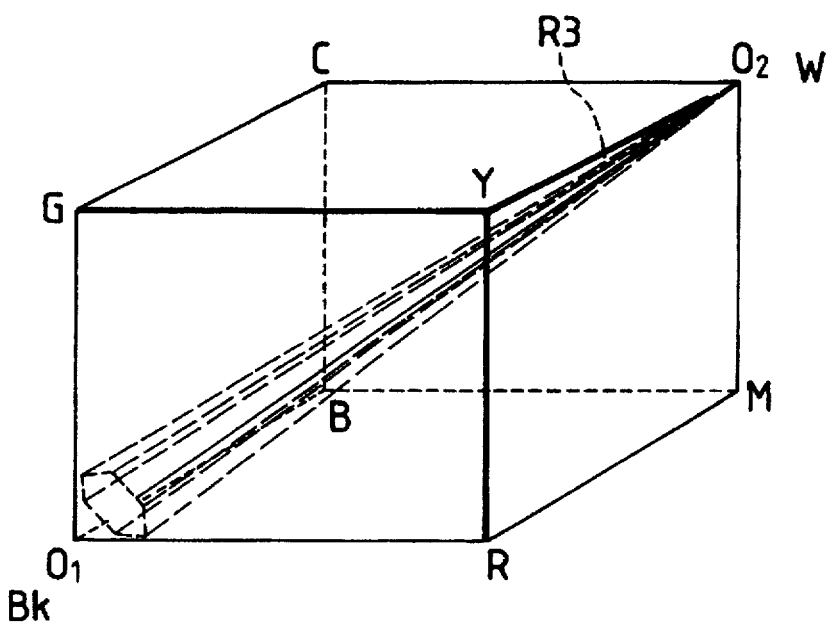
FIG. 15 is a model view explanatorily showing a principle of an achromatic color judging method according to a third embodiment of the present invention.

FIG. 15 is a model view explanatorily showing a principle of an achromatic color judging method according to a third embodiment.

As shown in FIG. 15, a color space in which all of colors defined in a RGB color system and a CMY color system are placed is expressed by cubic coordinates in the same manner as those shown in the FIG. 5, and an achromatic color region in the color space is specified according to a low lightness considering method of the achromatic color judging method.

In the low lightness considering method, an achromatic color region R3 in which many colors (C,M,Y) equivalent to the achromatic color are placed is defined on condition that an equation (34) is satisfied.

$$|C-M| \leq S3*M', \ |M-Y| \leq S3*M', \ |Y-C| \leq S3*M' \quad (34)$$

$C=\overline{R}, M=\overline{G}, Y=\overline{B}$ and M'=Max(C,M,Y)
Here the symbol S3 denotes a range of the achromatic color region R3.

The achromatic color region R3 defined according to the equation (34) corresponds to an internal region of a hexagonal pyramid R3 in which a central axis is equal to a diagonal line connecting the original point $O_1$ (red, green and blue components are respectively zero) and the original point $O_2$ (red, green and blue components are respectively maximized to a value 255 in an eight bit expression), a vertex is placed at the original point $O_2$ and a hexagonal bottom plane is placed close to the original point $O_1$.

Figure 16:
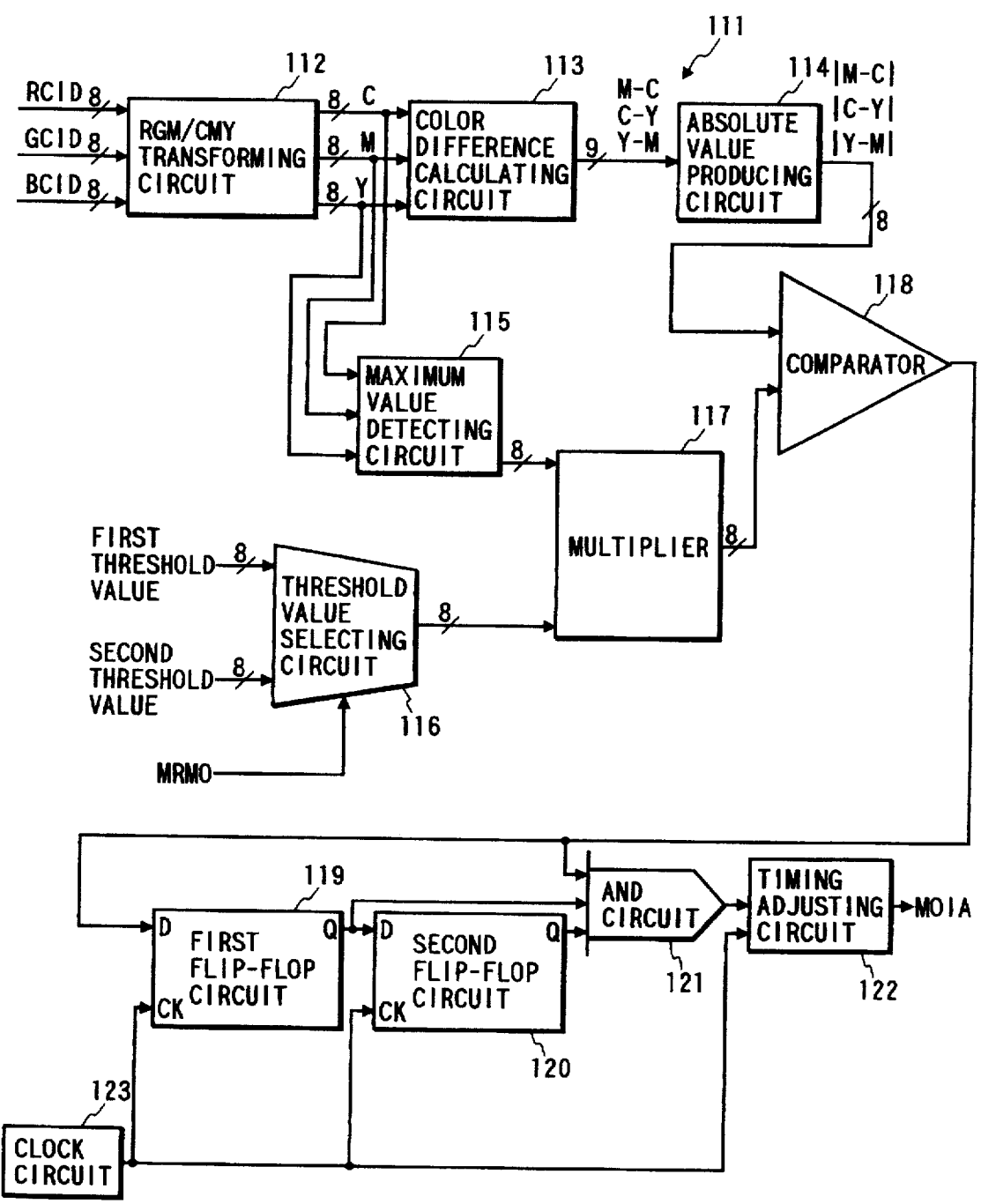
FIG. 16 is a block diagram of an achromatic color judging unit formed in a color difference calculating and maximum value detecting type, according to the third embodiment.

FIG. 16 is a block diagram of an achromatic color judging unit formed in a color difference calculating and maximum value detecting type, according to the third embodiment of the present invention.

As shown in FIG. 16, an achromatic color judging unit 111 comprises a RGB/CMY transforming circuit 112 for receiving the RGB multi-valued digital input signals GCID, RCID and BCID read in the color picture reading unit 23 and transforming the RGB multi-valued digital input signals GCID, RCID and BCID into pieces of CMY multi-valued digital signals indicating a cyan (C) component, a magenta (M) component and a yellow (Y) component, a color difference calculating circuit 113 for calculating a difference value Min–Cin between digital values of the M and C components, a difference value Cin–Yin between digital values of the C and Y components and a difference value Yin–Min between digital values of the Y and M components in time sequence, an absolute value producing circuit 114 for producing absolute values |Min–Cin|, |Cin–Yin| and |Yin–Min| of the difference values Min–Cin, Cin–Yin and Yin–Min, a maximum value detecting circuit 115 for detecting a maximum value among the values Cin, Min and Yin of the CMY multi-valued digital input signals, a threshold value selecting circuit 116 for selecting an achromatic judgement threshold value from a first threshold value and a second threshold value according to a threshold selecting signal MRMO transferred from the control unit 55, a multiplier 117 for multiplying the maximum value by the achromatic judgement threshold value to obtain a product value, a comparator 118 for comparing the absolute values |Min–Cin|, |Cin–Yin| and |Yin–Min| with the product value in time sequence to obtain a first compared result, a second compared result and a third compared result in that order, a first flip-flop circuit 119 for holding the second compared result after the first compared result is held, a second flip-flop circuit 120 for holding the first compared result transferred from the first flip-flop circuit 119, an AND circuit 121 for calculating a logical multiply of the second compared result held in the first flip-flop circuit 119, the first compared result held in the second flip-flop circuit 120 and the third compared result currently output from the comparator 118, a timing adjusting circuit 122 for outputting the logical multiply as an achromatic color judging signal MOIA in synchronization with the RGB binary data output from the error dispersion processing unit 22 while adjusting the time delay resulting from an operating time required in the error dispersion processing unit 22, and a clock circuit 123 for controlling the operation timing of the flip-flop circuits 119, 120 and the timing adjusting circuit 122 for an achromatic color judging processing.

In the above configuration, the multi-valued digital input signals GCID, RCID and BCID read in the color picture reading unit 23 are transformed into pieces of CMY multi-valued digital signals indicating a cyan (C) component, a magenta (M) component and a yellow (Y) component of the color picture of the remarked pixel in the RGB/CMY transforming circuit 112. Thereafter, a difference value Min–Cin, a difference value Cin–Yin and a difference value Yin–Min are calculated in time sequence in the color difference calculating circuit 113, and absolute values |Min–Cin|, |Cin–Yin| and |Yin–Min| are produced in the absolute value producing circuit 114. Also, a maximum value M' among the values Cin, Min and Yin of the multi-valued digital input signals GCID, RCID and BCID is detected in the maximum value detecting circuit 115.

Also, the first and second threshold values input to the threshold value selecting circuit 82 are prepared in advance. In detail, a distance from the central line of the hexagonal pyramid R3 to each of vertexes of the cubic coordinates is utilized as a parameter, and the first and second threshold values are respectively determined with the parameters. Thereafter, one of the threshold values is selected as an achromatic judgement threshold value according to the threshold selecting signal transferred from the control unit 55. The achromatic judgement threshold value corresponds to the range S3 of the achromatic color region R3. Thereafter, the maximum value M' is multiplied by the achromatic judgement threshold value in the multiplier 117 to obtain a product value. The product value corresponds to S3*M' of the equation (34).

Thereafter, the absolute values |Min–Cin|, |Cin–Yin| and |Yin–Min| produced in the absolute value producing circuit 114 are compared with the achromatic judgement threshold value in the comparator 118 in time sequence, and three compared results respectively indicating whether or not an absolute value obtained in the absolute color difference producing circuit 114 is lower than the achromatic judgement threshold value are obtained in the comparator 118 in time sequence. A first compared result corresponding to the comparison of the absolute values |Min–Cin| is held in the second flip-flop circuit 85 under control of the clock circuit 41 after the first compared result is held in the first flip-flop circuit 84, a second compared result corresponding to the comparison of the absolute values |Cin–Yin| is held in the first flip-flop circuit 84 under control of the clock circuit 88, and a third compared result corresponding to the comparison of the absolute values |Yin–Min| is currently output from the comparator 118. Thereafter, a logical multiply of the first, second and third compared results is calculated in the AND circuit 121. Therefore, when all of the absolute values |Min–Cin|, |Cin–Yin| and |Yin–Min| are lower than the achromatic judgement threshold value, the logical multiply indicates that the remarked pixel has an achromatic color. In contrast, when all of the absolute values |Min−Cin|, |Cin−Yin| and |Yin−Min| are not lower than the achromatic judgement threshold value, the logical multiply indicates that the remarked pixel has a chromatic color. Thereafter, the output of the logical multiply is delayed in the timing adjusting circuit 122 to output the logical multiply in synchronization with the RGB binary data output from the error dispersion processing unit 22, and the logical multiply is output as an achromatic color judging signal MOIA to the achromatic color reproducing and color transforming unit 25.

Accordingly, because the achromatic color region R3 is defined in the RGB system and the CMY system, it can be easily judged whether the remarked pixel has an achromatic color or a chromatic color. Therefore, a color picture processing can be easily performed by utilizing the multi-valued digital input signals GCID,RCID and BCID, and a configuration of the color picture processing apparatus according to the third embodiment can be simplified.

Also, because the achromatic color region R3 is widened on the side of a low lightness region, a boundary region between an achromatic color region and a chromatic color region can be smoothly reproduced. The reason is that a viewer does not sensitively feel the chromaticness of the color picture when the lightness is low.

Also, because the achromatic color region R3 is widened on the side of a low lightness region, when a black reproduced by mixing the cyan, the magenta and the yellow differs from another black reproduced by a black ink, in a printer such as an ink jet printer, colors close to a black of the achromatic color can be smoothly reproduced.

In the first, second and third embodiments, the color transformation from a red-green-blue (RGB) system to a red-green-blue-black (RGBK) system is performed in the achromatic color reproducing and color transforming unit 25. However, the present invention is not limited to the color transformation from the RGB system to the RGBK system. For example, a color transformation from the RGB system to a cyan-magenta-yellow-black (CMYK) system (FIGS. 17A and 17B), a color transformation from the RGB system to the RGB system (FIGS. 18A and 18B) or a color transformation from the RGB system to the CMY system (FIGS. 19A and 19B) is applicable.

FIG. 17A shows a table of transformation codes utilized to transform the RGB binary data RVSDA, GVSDA, BVSDA to pieces of CMYK output binary data CVSDB, MVSDB, YVSDB and KVSDB in case where it is judged in the unit 25 that the remarked pixel has an achromatic color (MOIA=1).

As shown in FIG. 17A, the G binary data is utilized as a piece of reference data to determine digital values of the CMYK output binary data CVSDB, MVSDB, YVSDB and KVSDB. Also, because the red and the cyan are complementary colors, the green and the magenta are complementary colors and the blue and the yellow are complementary colors, the CMY output binary data CVSDB, MVSDB and YVSDB are determined by inverting the RGB output binary data RVSDB, GVSDB and BVSDB shown in FIG. 7A.

FIG. 17B shows a table of transformation codes utilized to transform the RGB binary data RVSDA, GVSDA, BVSDA to pieces of CMYK output binary data CVSDB, MVSDB, YVSDB and KVSDB in case where it is judged in the unit 25 that the remarked pixel has a chromatic color (MOIA=0).

As shown in FIG. 17B, the CMY output binary data CVSDB, MVSDB and YVSDB obtained by inverting the RGB output binary data RVSDB, GVSDB and BVSDB shown in FIG. 7B are output, and the Bk data KVSDB set to zero is output not to print a printing paper with a black ink.

FIG. 18A shows a table of transformation codes utilized to transform the RGB binary data RVSDA, GVSDA, BVSDA to pieces of RGB output binary data RVSDB, GVSDB and BVSDB in case where it is judged in the unit 25 that the remarked pixel has an achromatic color (MOIA=1).

As shown in FIG. 18A, the G binary data is utilized as a piece of reference data to determine digital values of the RGB output binary data RVSDB, GVSDB and BVSDB. Therefore, the digital values of the RGB output binary data RVSDB, GVSDB and BVSDB are the same as those shown in FIG. 7A. Also, any achromatic color data KVSDB is not output, but the RGB output binary data RVSDB, GVSDB and BVSDB are output, and a printing paper is printed with one or more types of color ink corresponding to the RGB output binary data set to 1.

FIG. 18B shows a table of transformation codes utilized to transform the RGB binary data RVSDA, GVSDA, BVSDA to pieces of RGB output binary data RVSDB, GVSDB and BVSDB in case where it is judged in the unit 25 that the remarked pixel has a chromatic color (MOIA=0).

As shown in FIG. 18B, the RGB binary data RVSDA, GVSDA and BVSDA are output from the unit 25 as the RGB output binary data RVSDB, GVSDB and BVSDB without any color transformation. Therefore, the digital values of the RGB output binary data RVSDB, GVSDB and BVSDB are the same as those shown in FIG. 7B. Also, any achromatic color data KVSDB is not output, but the RGB output binary data RVSDB, GVSDB and BVSDB are output, and a printing paper is printed with one or more types of color ink corresponding to the RGB output binary data set to 1.

FIG. 19A shows a table of transformation codes utilized to transform the RGB binary data RVSDA, GVSDA, BVSDA to pieces of CMY output binary data CVSDB, MVSDB and YVSDB in case where it is judged in the unit 25 that the remarked pixel has an achromatic color (MOIA=1).

As shown in FIG. 19A, the G binary data is utilized as a piece of reference data to determine digital values of the CMY output binary data CVSDB, MVSDB and YVSDB. Also, the CMY output binary data CVSDB, MVSDB and YVSDB are determined by inverting the RGB output binary data RVSDB, GVSDB and BVSDB shown in FIG. 7A. Also, any achromatic color data KVSDB is not output, but the CMY output binary data CVSDB, MVSDB and YVSDB are output, and a printing paper is printed with one or more types of color ink corresponding to the CMY output binary data set to 1.

FIG. 19B shows a table of transformation codes utilized to transform the RGB binary data RVSDA, GVSDA, BVSDA to pieces of CMY output binary data CVSDB, MVSDB and YVSDB in case where it is judged in the unit 25 that the remarked pixel has a chromatic color (MOIA=0).

As shown in FIG. 19B, the CMY output binary data CVSDB, MVSDB and YVSDB obtained by inverting the RGB output binary data RVSDB, GVSDB and BVSDB shown in FIG. 7B are output, and any achromatic color data KVSDB is not output. Therefore, a printing paper is printed with one or more types of color ink corresponding to the CMY output binary data set to 1.

Also, in the first, second and third embodiments, the G binary data is utilized as a piece of reference data in case where it is judged in the unit 25 that the remarked pixel has an achromatic color (MOIA=1). However, it is applicable that the R binary data or the B binary data be utilized as a piece of reference data.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A color picture processing apparatus, comprising:

achromatic color judging means for judging whether a color picture at a remarked pixel has an achromatic color or a chromatic color according to a piece of first multi-valued primary color data, a piece of second multi-valued primary color data and a piece of third multi-valued primary color data indicating three primary color components of the color picture;

binary data converting means for converting the first, second and third multi-valued primary color data into three pieces of binary primary color data indicating the three primary color components of the color picture; and achromatic color reproducing means for generating and outputting a piece of achromatic color data indicating an achromatic color component of the color picture to reproduce the color picture of the remarked pixel according to the binary primary color data converted by the binary data converting means in cases where it is judged by the achromatic color judging means that the color picture at the remarked pixel has the achromatic color and outputting the binary primary color data to reproduce the color picture of the remarked pixel in cases where it is judged by the achromatic color judging means that the color picture at the remarked pixel has the chromatic color, wherein a first binary value of the achromatic color data output from the achromatic color reproducing means in case where it is judged by the achromatic color judging means that the color picture at the remarked pixel has the achromatic color is set to a second binary value of one of the binary primary color data converted by the binary data converting means, and third binary values of the other binary primary color data are set to the second binary value, the achromatic color of the color picture being reproduced by the three binary primary color data having the same binary value.

2. A color picture processing apparatus, comprising:

achromatic color judging means for judging whether a color picture at a remarked pixel has an achromatic color or a chromatic color according to a piece of first multi-valued primary color data, a piece of second multi-valued primary color data and a piece of third multi-valued primary color data indicating three primary color components of the color picture;

the achromatic color judging means comprising a maximum value detecting circuit for detecting a maximum value A from among three digital values of the first, second and third multi-valued primary color data, a minimum value detecting circuit for detecting a minimum value B from among the three digital values of the first, second and third multi-valued primary color data, a difference calculating circuit for calculating a differential value A-B between the maximum value A detected by the maximum value detecting circuit and the minimum value B detected by the minimum value detecting circuit, a dividing circuit for dividing the differential value A-B calculated by the difference calculating circuit by the maximum value A detected by the maximum value detecting circuit to obtain a divided value (A-B)/A, a selector for selecting an achromatic judging threshold value from a plurality of threshold values, a comparator for comparing the divided value (A-B)/A obtained in the dividing circuit with the achromatic judging threshold value, and a judging signal producing circuit for producing an achromatic color judging signal indicating that the color picture at the remarked pixel has the achromatic color in case where the divided value (A-B)/A compared by the comparator is equal to or lower than the achromatic judging threshold value and an achromatic color judging signal indicating that the color picture at the remarked pixel has the chromatic color in case where the divided value (A-B)/A compared by the comparator is higher than the achromatic judging threshold value;

binary data converting means for converting the first, second and third multi-valued primary color data into three pieces of binary primary color data indicating the three primary color components of the color picture; and achromatic color reproducing means for generating and outputting a piece of achromatic color data indicating an achromatic color component of the color picture to reproduce the color picture of the remarked pixel according to the binary primary color data converted by the binary data converting means in cases where the judging signal producing circuit of the achromatic color judging means produces the achromatic color judging signal indicating that the color picture at the remarked pixel has the achromatic color and outputting the binary primary color data to reproduce the color picture of the remarked pixel in cases where the judging signal producing circuit of the achromatic color judging means produces the achromatic color judging signal indicating that the color picture at the remarked pixel has the chromatic color.

3. A color picture processing apparatus, comprising:

achromatic color judging means for judging whether a color picture at a remarked pixel has an achromatic color or a chromatic color according to a piece of first multi-valued primary color data, a piece of second multi-valued primary color data and a piece of third multi-valued primary color data indicating three primary color components of the color picture, the achromatic color judging means judging that the color picture at the remarked pixel has an achromatic color in case where the primary color components of the color picture are placed within an achromatic color region widened on a high lightness side in a primary color space;

binary data converting means for converting the first, second and third multi-valued primary color data into three pieces of binary primary color data indicating the three primary color components of the color picture; and achromatic color reproducing means for generating and outputting a piece of achromatic color data indicating an achromatic color component of the color picture to reproduce the color picture of the remarked pixel according to the binary primary color data converted by the binary data converting means in cases where it is judged by the achromatic color judging means that the color picture at the remarked pixel has the achromatic color and outputting the binary primary color data to reproduce the color picture of the remarked pixel in cases where it is judged by the achromatic color judging means that the color picture at the remarked pixel has the chromatic color.

4. A color picture processing apparatus according to claim 3 in which the achromatic color region is formed in a hexagonal pyramid in which a central line connects a black point and a white point, a vertex is placed at the black point and a hexagonal bottom plane is placed near to the white point.

5. A color picture processing apparatus, comprising:

achromatic color judging means for judging whether a color picture at a remarked pixel has an achromatic color or a chromatic color according to a piece of first multi-valued primary color data, a piece of second multi-valued primary color data and a piece of third multi-valued primary color data indicating three primary color components of the color picture, the achromatic color judging means comprising a color difference calculating circuit for calculating a piece of first multi-valued color difference data defined as a first difference between the first and second multi-valued primary color data, a piece of second multi-valued color difference data defined as a second difference between the first and third multi-valued primary color data and a piece of third multi-valued color difference data defined as a third difference between the second and third multi-valued primary color data, an absolute value calculating circuit for calculating three absolute values of the first, second and third multi-valued color difference data calculated by the color difference calculating circuit, a maximum value detecting circuit for detecting a maximum value from among three digital values of the first, second and third multi-valued primary color data, a multiplying circuit for multiplying the maximum value detected by the maximum value detecting circuit by an achromatic color judging threshold value to produce a multiplied value, a comparator for comparing each of the absolute values calculated in the absolute value calculating circuit with the multiplied value produced in the multiplying circuit, and a judging signal producing circuit for producing an achromatic color judging signal indicating that the color picture at the remarked pixel has the achromatic color in case where the absolute values compared with the multiplied value in the comparator are respectively equal to or lower than the multiplied value and producing an achromatic color judging signal indicating that the color picture at the remarked pixel has the chromatic color in case where one of the absolute values compared with the multiplied value in the comparator is higher than the multiplied value, binary data converting means for converting the first, second and third multi-valued primary color data into three pieces of binary primary color data indicating the three primary color components of the color picture; and achromatic color reproducing means for generating and outputting a piece of achromatic color data indicating an achromatic color component of the color picture to reproduce the color picture of the remarked pixel according to the binary primary color data converted by the binary data converting means in cases where the achromatic color judging signal indicating that the color picture at the remarked pixel has the achromatic color is produced by the judging signal producing circuit of the achromatic color judging means and outputting the binary primary color data to reproduce the color picture of the remarked pixel in cases where the achromatic color judging signal indicating that the color picture at the remarked pixel has the chromatic color is produced by the judging signal producing circuit of the achromatic color judging means.

6. A color picture processing apparatus according to claim 5 in which the achromatic color judging means further comprises a selector for selecting the achromatic judging threshold value utilized in the multiplying circuit from a plurality of threshold values.

7. A color picture processing apparatus, comprising:

achromatic color judging means for judging whether a color picture at a remarked pixel has an achromatic color or a chromatic color according to a piece of first multi-valued primary color data, a piece of second multi-valued primary color data and a piece of third multi-valued primary color data indicating three primary color components of the color picture, the achromatic color judging means comprising a color transforming circuit for transforming the first, second and third multi-valued primary color data defined in a first primary color system into a piece of first multi-valued transformed color data, a piece of second multi-valued transformed color data and a piece of third multi-valued transformed color data defined in a second primary color system which has a complementary relationship with the first primary color system, a color difference calculating circuit for calculating a piece of first multi-valued color difference data defined as a first difference between the first and second multi-valued transformed color data obtained in the color transforming circuit, a piece of second multi-valued color difference data defined as a second difference between the first and third multi-valued transformed color data obtained in the color transforming circuit and a piece of third multi-valued color difference data defined as a third difference between the second and third multi-valued transformed color data, an absolute value calculating circuit for calculating three absolute values of the first, second and third multi-valued color difference data calculated by the color difference calculating circuit, a maximum value detecting circuit for detecting a maximum value from among three digital values of the first, second and third multi-valued transformed color data obtained in the color transforming circuit, a multiplying circuit for multiplying the maximum value detected by the maximum value detecting circuit by an achromatic color judging threshold value to produce a multiplied value, a comparator for comparing each of the absolute values calculated in the absolute value calculating circuit with the multiplied value produced in the multiplying circuit, and a judging signal producing circuit for producing an achromatic color judging signal indicating that the color picture at the remarked pixel has the achromatic color in case where the absolute values compared with the multiplied value in the comparator are respectively equal to or lower than the multiplied value and producing an achromatic color judging signal indicating that the color picture at the remarked pixel has the chromatic color in case where one of the absolute values compared with the multiplied value in the comparator is higher than the multiplied value, binary data converting means for converting the first, second and third multi-valued primary color data into three pieces of binary primary color data indicating the three primary color components of the color picture; and achromatic color reproducing means for generating and outputting a piece of achromatic color data indicating an achromatic color component of the color picture to reproduce the color picture of the remarked pixel according to the binary primary color data converted by the binary data converting means in cases where the achromatic color judging signal indicating that the color picture at the remarked pixel has the achromatic color is produced by the judging signal producing circuit of the achromatic color judging means and outputting the binary primary color data to reproduce the color picture of the remarked pixel in cases where the achromatic color judging signal indicating that the color picture at the remarked pixel has the chromatic color is produced by the judging signal producing circuit of the achromatic color judging means.

8. A color picture processing apparatus according to claim 7 in which the first multi-valued primary color data indicates a red component of the color picture, the second multi-valued primary color data indicates a green component of the color picture, the third multi-valued primary color data indicates a blue component of the color picture, the first multi-valued transformed color data indicates a cyan component of the color picture, the second multi-valued transformed color data indicates a magenta component of the color picture, and the third multi-valued transformed color data indicates a yellow component of the color picture.

9. A color picture processing apparatus, comprising:

color difference calculating means for receiving a piece of first multi-valued primary color data, a piece of second multi-valued primary color data and a piece of third multi-valued primary color data indicating three primary color components of a color picture at a remarked pixel and calculating a piece of first multi-valued color difference data defined as a first difference between the first and second multi-valued primary color data, a piece of second multi-valued color difference data defined as a second difference between the first and third multi-valued primary color data and a piece of third multi-valued color difference data defined as a third difference between the second and third multi-valued primary color data;

matrix color correcting means for correcting the first, second and third multi-valued primary color data to a piece of first multi-valued corrected color data, a piece of second multi-valued corrected color data and a piece of third multi-valued corrected color data;

achromatic color judging means for judging whether the color picture at the remarked pixel has an achromatic color or a chromatic color according to the first, second and third multi-valued color difference data calculated by the color difference calculating means;

binary data converting means for converting the first, second and third multi-valued corrected color data obtained in the matrix color correcting means into three pieces of binary corrected color data; and achromatic color reproducing means for generating and outputting a piece of achromatic color data indicating an achromatic color component of the color picture to reproduce the color picture of the remarked pixel according to the binary primary color data converted by the binary data converting means in cases where it is judged by the achromatic color judging means that the color picture at the remarked pixel has the achromatic color and outputting the binary primary color data to reproduce the color picture of the remarked pixel in cases where it is judged by the achromatic color judging means that the color picture at the remarked pixel has the chromatic color, wherein a first binary value of the achromatic color data output from the achromatic color reproducing means in case where it is judged by the achromatic color judging means that the color picture at the remarked pixel has the achromatic color is set to a second binary value of one of the binary corrected color data converted by the binary data converting means, and third binary values of the other binary corrected color data are set to the second binary value, the achromatic color of the color picture being reproduced by the three binary corrected color data having the same binary value.

10. A color picture processing apparatus, comprising:

color difference calculating means for receiving a piece of first multi-valued primary color data, a piece of second multi-valued primary color data and a piece of third multi-valued primary color data indicating three primary color components of a color picture at a remarked pixel and calculating a piece of first multi-valued color difference data defined as a first difference between the first and second multi-valued primary color data, a piece of second multi-valued color difference data defined as a second difference between the first and third multi-valued primary color data and a piece of third multi-valued color difference data defined as a third difference between the second and third multi-valued primary color data;

matrix color correcting means for correcting the first, second and third multi-valued primary color data to a piece of first multi-valued corrected color data, a piece of second multi-valued corrected color data and a piece of third multi-valued corrected color data;

achromatic color judging means for judging whether the color picture at the remarked pixel has an achromatic color or a chromatic color according to the first, second and third multi-valued color difference data calculated by the color difference calculating means, the achromatic color judging means comprising an absolute value calculating circuit for calculating three absolute values of the first, second and third multi-valued color difference data, a comparator for comparing each of the absolute values calculated in the absolute value calculating circuit with an achromatic judging threshold value, a judging signal producing circuit for producing an achromatic color judging signal indicating that the color picture at the remarked pixel has the achromatic color in case where the absolute values compared with the achromatic judging threshold value in the comparator are respectively equal to or lower than the achromatic judging threshold value and producing an achromatic color judging signal indicating that the color picture at the remarked pixel has the chromatic color in case where one of the absolute values compared with the achromatic judging threshold value in the comparator is higher than the achromatic judging threshold value, and a selector for selecting the achromatic judging threshold value compared in the comparator from a plurality of threshold values;

binary data converting means for converting the first, second and third multi-valued corrected color data obtained in the matrix color correcting means into three pieces of binary corrected color data; and achromatic color reproducing means for generating and outputting a piece of achromatic color data indicating an achromatic color component of the color picture to reproduce the color picture of the remarked pixel according to the binary primary color data converted by the binary data converting means in cases where it is judged by the achromatic color judging means that the color picture at the remarked pixel has the achromatic color and outputting the binary primary color data to reproduce the color picture of the remarked pixel in cases where it is judged by the achromatic color judging means that the color picture at the remarked pixel has the chromatic color.

11. A color picture processing apparatus, comprising:

matrix correcting factor storing means for storing a plurality of first values of a first matrix correcting factor varying with a piece of first multi-valued color difference data defined as a first difference between pieces of first and second multi-valued primary color data, a plurality of second values of a second matrix correcting factor varying with a piece of second multi-valued color difference data defined as a second difference between pieces of first and third multi-valued primary color data and a plurality of third values of a third matrix correcting factor varying with a piece of third multi-valued color difference data defined as a third difference between pieces of second and third multi-valued primary color data;

color difference calculating means for receiving a piece of particular first multi-valued primary color data, a piece of particular second multi-valued primary color data, a piece of particular third multi-valued primary color data indicating three primary color components of a color picture at a remarked pixel and calculating a particular first difference value of a piece of particular first multi-valued color difference data defined as a first difference between the particular first and second multi-valued primary color data, a particular second difference value of a piece of particular second multi-valued color difference data defined as a second difference between the particular first and third multi-valued primary color data and a particular third difference value of a piece of particular third multi-valued color difference data defined as a third difference between the particular second and third multi-valued primary color data;

control means for controlling the selection of a particular first value of the first matrix correcting factor corresponding to the particular first difference value of the particular first multi-valued color difference data calculated in the color difference calculating means from among the first values stored in the matrix correcting factor storing means, the selection of a particular second value of the second matrix correcting factor corresponding to the particular second difference value of the particular second multi-valued color difference data calculated in the color difference calculating means from among the second values stored in the matrix correcting factor storing means, and the selection of a particular third value of the third matrix correcting factor corresponding to the particular third difference value of the particular third multi-valued color difference data calculated in the color difference calculating means from among the third values stored in the matrix correcting factor storing means;

corrected color data producing means for producing a piece of first multi-valued corrected color data from the particular first value of the first matrix correcting factor selected under the control of the control means and the particular first difference value of the first multi-valued color difference data calculated in the color difference calculating means, a piece of second multi-valued corrected color data from the particular second value of the second matrix correcting factor selected under the control of the control means and the particular second difference value of the second multi-valued color difference data calculated in the color difference calculating means, and a piece of third multi-valued corrected color data from the particular third value of the third matrix correcting factor selected under the control of the control means and the particular third difference value of the third multi-valued color difference data calculated in the color difference calculating means;

binary data converting means for converting the first, second and third multi-valued corrected color data produced in the corrected color data producing means into three pieces of binary color data;

achromatic color judging means for judging whether the color picture at the remarked pixel has an achromatic color or a chromatic color according to the particular first, second and third multi-valued color difference data calculated by the color difference calculating means; and achromatic color reproducing means for outputting a piece of achromatic color data to reproduce an achromatic color of the color picture in case where it is judged by the achromatic color judging means that the color picture at the remarked pixel has the achromatic color and outputting the binary color data converted by the binary data converting means to reproduce a chromatic color of the color picture in case where it is judged by the achromatic color judging means that the color picture at the remarked pixel has the chromatic color.

12. A color picture processing apparatus according to claim 11 in which the first multi-valued primary color data indicates a red component of the color picture, the second multi-valued primary color data indicates a green component of the color picture and the third multi-valued primary color data indicates a blue component of the color picture.

13. A color picture processing apparatus according to claim 11 in which the first multi-valued corrected color data produced in the corrected color data producing means is obtained by adding the particular first value of the first matrix correcting factor and the particular first difference value of the particular first multi-valued color difference data, the second multi-valued corrected color data produced in the corrected color data producing means is obtained by adding the particular second value of the second matrix correcting factor and the particular second difference value of the particular second multi-valued color difference data, and the third multi-valued corrected color data produced in the corrected color data producing means is obtained by adding the particular third value of the third matrix correcting factor and the particular third difference value of the particular third multi-valued color difference data.

14. A color picture processing apparatus, comprising:

matrix element storing means for storing a first matrix element, a second matrix element and a third matrix element of a color transforming matrix;

color difference calculating means for receiving a piece of first multi-valued primary color data, a piece of second multi-valued primary color data and a piece of third multi-valued primary color data indicating three primary color components of a color picture at a remarked pixel and calculating a piece of first multi-valued color difference data defined as a first difference between the first and second multi-valued primary color data, a piece of second multi-valued color difference data defined as a second difference between the first and third multi-valued primary color data and a piece of third multi-valued color difference data defined as a third difference between the second and third multi-valued primary color data;

multiplying means for multiplying the first multi-valued color difference data calculated in the color difference calculating means by the first matrix element stored in the matrix element storing means to produce a first matrix correcting factor, multiplying the second multi-valued color difference data calculated in the color difference calculating means by the second matrix element stored in the matrix element storing means to produce a second matrix correcting factor, and multiplying the third multi-valued color difference data calculated in the color difference calculating means by the third matrix element stored in the matrix element storing means to produce a third matrix correcting factor;

corrected color data producing means for producing a piece of first multi-valued corrected color data from the first matrix correcting factor obtained in the multiplying means and the first multi-valued color difference data calculated in the color difference calculating means, a piece of second multi-valued corrected color data from the second matrix correcting factor obtained in the multiplying means and the second multi-valued color difference data calculated in the color difference calculating means and a piece of third multi-valued corrected color data from the third matrix correcting factor obtained in the multiplying means and the third multi-valued color difference data calculated in the color difference calculating means;

binary data converting means for converting the first, second and third multi-valued corrected color data produced in the corrected color data producing means into three pieces of binary color data;

achromatic color judging means for judging whether the color picture at the remarked pixel has an achromatic color or a chromatic color according to the first, second and third multi-valued color difference data calculated by the color difference calculating means; and achromatic color reproducing means for outputting a piece of achromatic color data to reproduce an achromatic color of the color picture in case where it is judged by the achromatic color judging means that the color picture at the remarked pixel has the achromatic color and outputting the binary color data converted by the binary data converting means to reproduce a chromatic color of the color picture in case where it is judged by the achromatic color judging means that the color picture at the remarked pixel has the chromatic color.

15. A color picture processing apparatus according to claim 14 in which the first multi-valued primary color data indicates a red component of the color picture, the second multi-valued primary color data indicates a green component of the color picture and the third multi-valued primary color data indicates a blue component of the color picture.

16. A color picture processing apparatus according to claim 15 in which the first multi-valued corrected color data produced in the corrected color data producing means is obtained by adding the first matrix correcting factor and the first multi-valued color difference data, the second multi-valued corrected color data produced in the corrected color data producing means is obtained by adding the second matrix correcting factor and the second multi-valued color difference data, and the third multi-valued corrected color data produced in the corrected color data producing means is obtained by adding the third matrix correcting factor and the third multi-valued color difference data.

* * * * *